United States Patent
Badre-Alam et al.

(10) Patent No.: US 8,961,139 B2
(45) Date of Patent: Feb. 24, 2015

(54) AIRCRAFT PROPELLER BALANCING SYSTEM

(75) Inventors: Askari Badre-Alam, Apex, NC (US); David Boswell, Raleigh, NC (US); Donald Morris, Wendell, NC (US); Wayne Winzenz, Raleigh, NC (US)

(73) Assignee: LORD Corporation, Cary, NC (US)

( * ) Notice: Subject to any disclaimer, the term of this patent is extended or adjusted under 35 U.S.C. 154(b) by 833 days.

(21) Appl. No.: 12/925,138

(22) Filed: Oct. 14, 2010

(65) Prior Publication Data

US 2011/0197703 A1    Aug. 18, 2011

Related U.S. Application Data

(60) Provisional application No. 61/251,412, filed on Oct. 14, 2009.

(51) Int. Cl.
*B64C 11/08* (2006.01)
*F01D 25/04* (2006.01)
*B64C 11/00* (2006.01)

(52) U.S. Cl.
CPC .............. *B64C 11/008* (2013.01); *F01D 25/04* (2013.01); *Y10S 416/50* (2013.01)
USPC .............. 416/144; 416/80; 416/145; 416/500

(58) Field of Classification Search
USPC ................................... 416/80, 144, 145, 500
See application file for complete search history.

(56) References Cited

U.S. PATENT DOCUMENTS

| | | |
|---|---|---|
| 4,419,900 A | 12/1983 | Scott et al. |
| 5,136,841 A | 8/1992 | Zimmerman |

(Continued)

FOREIGN PATENT DOCUMENTS

| | | |
|---|---|---|
| DE | 10 2007 028728 | 12/2008 |
| WO | 96/17294 | 6/1996 |
| WO | 99/61314 | 12/1999 |
| WO | 2008/127362 | 10/2008 |
| WO | 2011/046620 | 4/2011 |

OTHER PUBLICATIONS

Alaskan Airplane Maintenance, Dynamic Propeller Balancing, 3 pgs., Oct. 6, 2009.

(Continued)

*Primary Examiner* — Edward Look
*Assistant Examiner* — Christopher R Legendre
(74) *Attorney, Agent, or Firm* — Richard G. Miller

(57) ABSTRACT

An aircraft system/method for propeller balancing. The system includes an inboard driver with a first and second inboard electromagnetic coil, the inboard driver and the first counterweight balancing rotor and the second counterweight balancing rotor centered around the aircraft propeller shaft rotating machine member with the first inboard electromagnetic coil proximate the first inboard magnets of the first counterweight balancing rotor, with the inboard electromagnetic coil driver proximate the rotation axis of the aircraft propeller shaft rotating machine member and the first counterweight balancing rotor outboard of the inboard electromagnetic coil driver with the first inboard electromagnetic coil generating a electromagnetic field to electromagnetically step the first inboard magnets of the at least first counterweight balancing rotor to electromagnetically actuate rotational movement of the first counterweight balancing rotor around the rotating machine member and relative to the inboard electromagnetic coil driver to a first rotor held balancing position.

67 Claims, 26 Drawing Sheets

(56) References Cited

U.S. PATENT DOCUMENTS

| | | | |
|---|---|---|---|
| 5,172,325 A | 12/1992 | Heidari | |
| 5,537,861 A | 7/1996 | Seitelman et al. | |
| 5,676,025 A * | 10/1997 | Lulay | 74/570.2 |
| 5,757,662 A * | 5/1998 | Dyer et al. | 700/279 |
| 6,123,623 A | 9/2000 | Sugiyama | |
| 6,236,934 B1 * | 5/2001 | Dyer et al. | 701/124 |
| 6,302,356 B1 * | 10/2001 | Hawkins | 244/17.11 |
| 6,512,319 B1 | 1/2003 | Horng et al. | |
| 6,787,965 B1 | 9/2004 | Horng et al. | |
| 6,923,058 B2 | 8/2005 | Nieman et al. | |
| 7,448,854 B2 * | 11/2008 | Jolly et al. | 416/1 |
| 7,717,013 B2 * | 5/2010 | Hildebrand et al. | 74/574.2 |
| 7,882,765 B2 * | 2/2011 | Webster et al. | 74/572.1 |
| 8,070,089 B2 | 12/2011 | Ferrier | 244/6 |
| 8,313,296 B2 * | 11/2012 | Jolly et al. | 416/55 |
| 8,360,728 B2 * | 1/2013 | Hildebrand et al. | 416/145 |
| 2005/0260091 A1 * | 11/2005 | Staffend | 418/1 |
| 2006/0005623 A1 * | 1/2006 | Hildebrand et al. | 73/468 |
| 2006/0083617 A1 * | 4/2006 | Jolly et al. | 416/133 |
| 2007/0156289 A1 | 7/2007 | Altieri et al. | |
| 2009/0035137 A1 * | 2/2009 | Jolly et al. | 416/145 |
| 2011/0197703 A1 * | 8/2011 | Badre-Alam et al. | 74/574.1 |
| 2012/0269626 A1 * | 10/2012 | Winzenz et al. | 416/1 |

OTHER PUBLICATIONS

DHI, The Idea Company, Metal Fiber Brushes (MFBs) for De-icing Applications, 1 pg., printed Oct. 12, 2009.

Hartzell Propeller Inc., Hartzell Propeller Inc. Service Letter, HC-SL-61-239, Propeller—Slip Ring Split Mounting Plate Inspection and Repair, 4 pgs., Jan. 2005.

Mid Atlantic Aviation Inc., Dynamic Propeller Balance, 1 pg., Oct. 6, 2009.

* cited by examiner

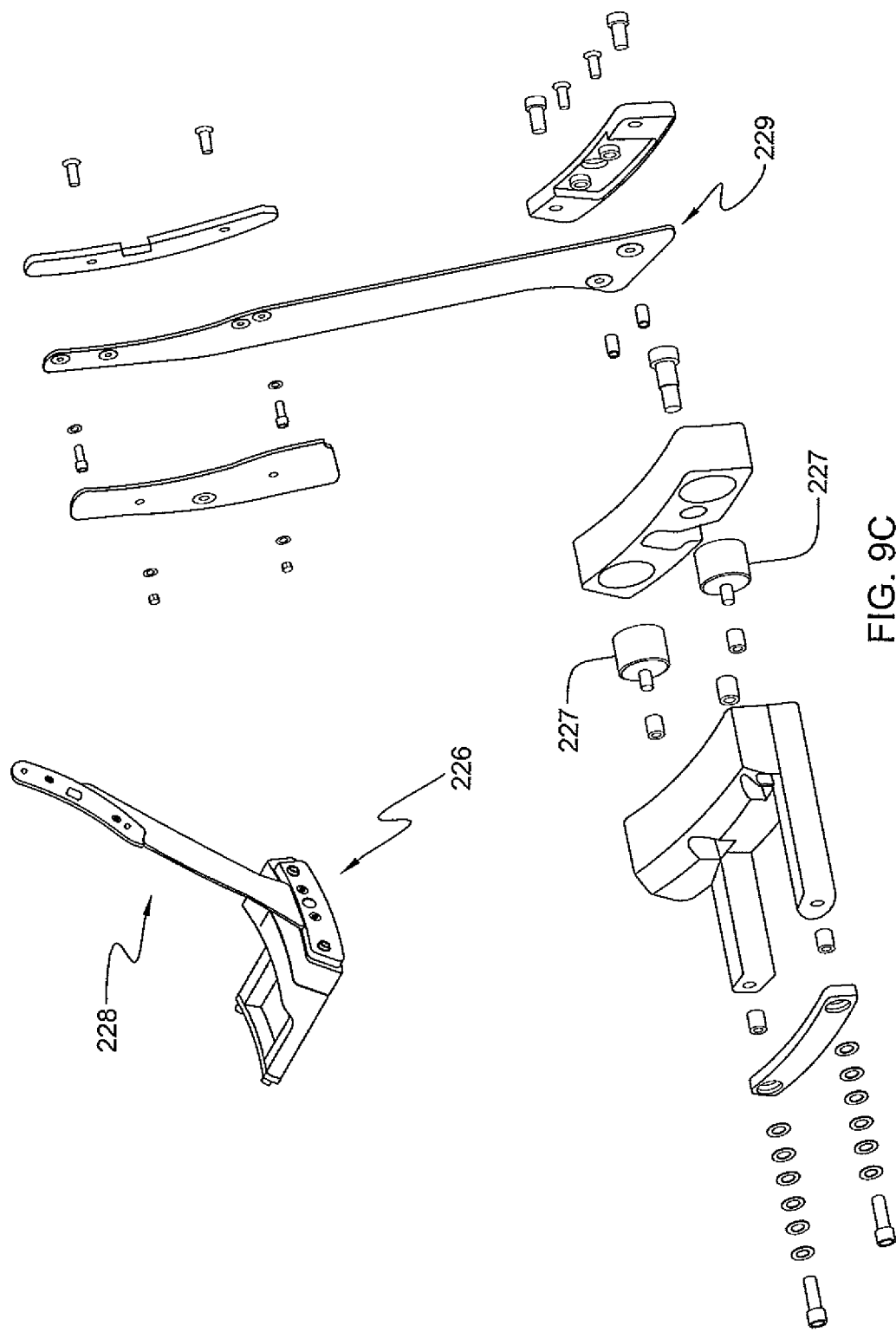

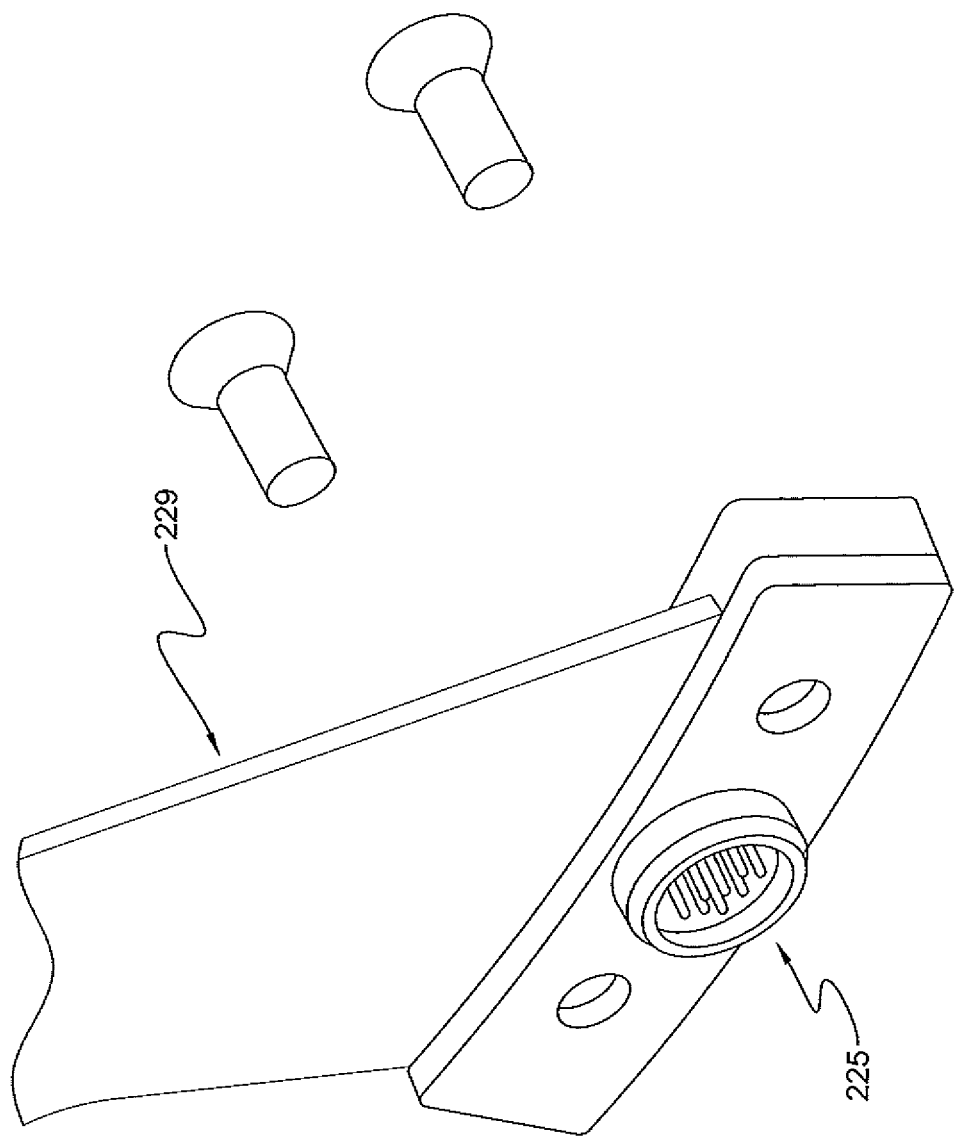

AIRCRAFT PROPELLER BALANCING SYSTEM

This application claims the benefit of, and incorporates by reference, U.S. Provisional Patent Application No. 61/251,412 filed on Oct. 14, 2009, titled AIRCRAFT PROPELLER BALANCING SYSTEM

FIELD OF THE INVENTION

The invention relates to the field of rotating balancing devices. More particularly, the invention relates to the field of balancing aircraft rotating systems, particularly balancing aircraft propelling systems.

BACKGROUND INFORMATION

Aircraft propeller systems, machine tool assemblies, turbo machinery, and other rotating equipment typically include a high speed rotating shaft, spindle, or other type of elongated member. These devices normally experience a certain amount of vibration caused by an imbalance in the propeller, tool, etc. The vibration, if not corrected, can cause the device to run inefficiently and ultimately fail.

SUMMARY OF THE INVENTION

In an embodiment the invention includes a method of balancing an aircraft propeller system. Preferably the method includes providing an aircraft propeller system with a rotating machine propeller shaft member which rotates around a rotation axis. Preferably the method includes providing a first counterweight rotating balancing rotor, the first counterweight balancing rotor including a first plurality of holding stepping inboard magnets and a first outboard mass concentration. Preferably the method includes providing a second counterweight rotating balancing rotor, the second counterweight balancing rotor including a second plurality of holding stepping inboard magnets and a second outboard mass concentration. Preferably the method includes providing corresponding pole plates which correspond and are oriented with the holding stepping inboard magnets. Preferably the method includes providing an inboard electromagnetic coil driver, the inboard electromagnetic coil driver including a first inboard electromagnetic coil, and a second inboard electromagnetic coil. Preferably the method includes disposing the inboard electromagnetic coil driver and the first counterweight balancing rotor and the second counterweight balancing rotor around the rotating machine propeller shaft member with the first inboard electromagnetic coil proximate the first inboard magnets of the first counterweight balancing rotor, the inboard electromagnetic coil driver proximate the rotation axis and the first counterweight balancing rotor outboard of the inboard electromagnetic coil driver, the first inboard electromagnetic coil generating a electromagnetic field to electromagnetically step the first inboard magnets of the at least first counterweight balancing rotor to electromagnetically actuate rotational movement of the first counterweight balancing rotor around the rotating machine member and relative to the inboard nonrotating electromagnetic coil driver and pole plates, and the second inboard electromagnetic coil proximate second counterweight balancing rotor, with the second inboard electromagnetic coil proximate the second inboard magnets of the second counterweight balancing rotor, wherein the second inboard electromagnetic coil generates an electromagnetic field to electromagnetically step the second inboard magnets of the second counterweight balancing rotor to electromagnetically actuate rotational movement of the second counterweight balancing rotor around the rotation axis and relative to the inboard electromagnetic coil driver and pole plates.

In an embodiment the invention includes an aircraft system, the aircraft system including a rotating machine member which rotates around a rotation axis. The aircraft system preferably includes a first counterweight rotating balancing rotor, the first counterweight balancing rotor including a first plurality of holding stepping inboard magnets and a first outboard mass concentration. The aircraft system preferably includes a second counterweight rotating balancing rotor, the second counterweight balancing rotor including a second plurality of holding stepping inboard magnets and a second outboard mass concentration. The aircraft system preferably includes an inboard electromagnetic coil driver, the inboard electromagnetic coil driver including a first inboard electromagnetic coil, and a second inboard electromagnetic coil. Preferably the inboard nonrotating electromagnetic coil driver and the first counterweight balancing rotor and the second counterweight balancing rotor are centered around the rotating machine member with the first inboard electromagnetic coil proximate the first inboard magnets of the first counterweight balancing rotor, the inboard electromagnetic coil driver proximate the rotation axis and the first counterweight balancing rotor outboard of the inboard nonrotating electromagnetic coil driver with the first inboard electromagnetic coil generating a electromagnetic field to electromagnetically step the first inboard magnets of the at least first counterweight balancing rotor to electromagnetically actuate rotational movement of the first counterweight balancing rotor around the rotating machine member and relative to the inboard electromagnetic coil driver to a first rotor held balancing position, and the second inboard electromagnetic coil proximate the second counterweight balancing rotor, with the second inboard electromagnetic coil proximate the second inboard magnets of the second counterweight balancing rotor, wherein the second inboard electromagnetic coil generates an electromagnetic field to electromagnetically step the second inboard magnets of the second counterweight balancing rotor to electromagnetically actuate rotational movement of the second counterweight balancing rotor around the rotation axis and relative to the inboard electromagnetic coil driver to a second rotor held position.

In an embodiment the invention includes an electromagnetically actuated machine balancer for mounting on a rotating machine member and balancing the rotating machine member. The electromagnetically actuated balancer preferably comprising at least a first counterweight rotating balancing rotor, the first counterweight balancing rotor including a first plurality of inboard magnets and a first outboard mass concentration. The electromagnetically actuated balancer preferably comprising an inboard nonrotating electromagnetic coil driver, the inboard electromagnetic coil driver including at least a first inboard electromagnetic coil, the first inboard electromagnetic coil proximate the first inboard magnets of the counterweight balancing rotor, wherein the first inboard electromagnetic coil generates an electromagnetic field to electromagnetically step the first inboard magnets of the at least first counterweight balancing rotor to electromagnetically actuate rotational movement of the first counterweight balancing rotor around the rotation axis and relative to the inboard nonrotating electromagnetic coil driver.

In an embodiment the invention includes a method of making an electromagnetically actuated balancer. Preferably the method includes providing a first counterweight rotating balancing rotor, the first counterweight balancing rotor including a first plurality of inboard magnets and a first outboard mass concentration. Preferably the method includes providing an inboard nonrotating electromagnetic coil driver, the inboard electromagnetic coil driver including at least a first inboard electromagnetic coil. Preferably the method includes disposing the first inboard electromagnetic coil proximate the first inboard magnets of the counterweight balancing rotor, wherein the first inboard electromagnetic coil generates a magnet field to electromagnetically step the first inboard magnets of the at least first counterweight balancing rotor to electromagnetically actuate rotational movement of the first counterweight balancing rotor relative to the inboard nonrotating electromagnetic coil driver.

In an embodiment the invention includes a method of electromagnetically balancing a rotating machine member which rotates about a rotation axis. The method preferably includes providing a first counterweight rotating balancing rotor, the first counterweight balancing rotor including a first plurality of inboard magnets and a first outboard mass concentration. The method preferably includes providing an inboard nonrotating electromagnetic coil driver, the inboard electromagnetic coil driver including at least a first inboard electromagnetic coil. The method preferably includes disposing the inboard nonrotating electromagnetic coil driver and the first counterweight balancing rotor around the rotating machine member with the first inboard electromagnetic coil proximate the first inboard magnets of the first counterweight balancing rotor, the inboard nonrotating electromagnetic coil driver proximate the rotation axis and the first counterweight balancing rotor outboard of the inboard nonrotating electromagnetic coil driver wherein the first inboard electromagnetic coil generates a electromagnetic field to electromagnetically step the first inboard magnets of the at least first counterweight balancing rotor to electromagnetically actuate rotational movement of the first counterweight balancing rotor around the rotating machine member and relative to the inboard nonrotating electromagnetic coil driver.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 9A-G illustrates rotation restraints.

DETAILED DESCRIPTION OF THE PREFERRED EMBODIMENT

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes an aircraft propeller balancing system for balancing a rotating machine member of the aircraft.

Figure 1:
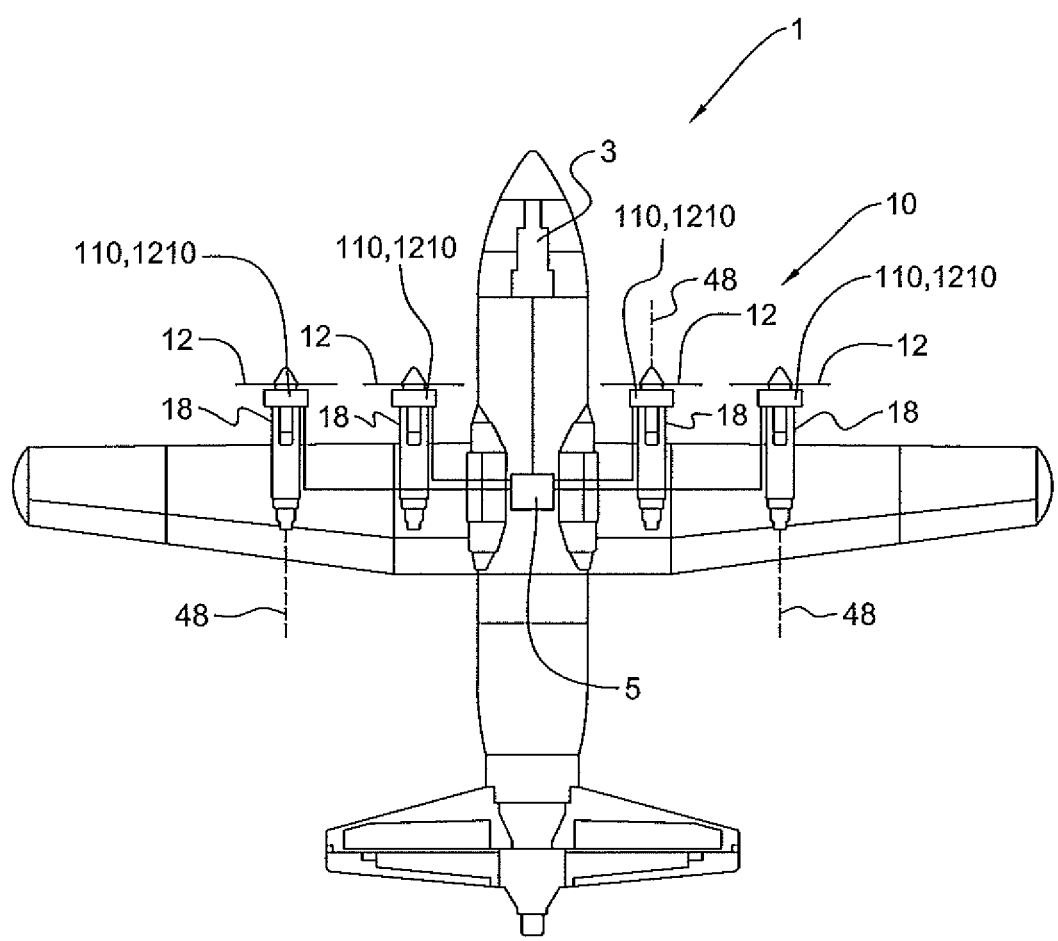
FIG. 1 illustrates a fixed wing aircraft with a propeller balancing system.

FIG. 1 shows an embodiment of the invention with an aircraft 1 equipped with an automatic balancing system 10 in accordance with an embodiment of the present invention. The aircraft 1 has an aircraft propelling system 3 including at least a first propeller 12, and preferably a plurality of propellers 12 and engines/gearboxes 18. The aircraft balancing system 10 preferably includes a balancer assembly 110 coupled to propellers 12. The balancer assemblies 110 are preferably controlled by at least a first balancer control system 5.

Figure 2:
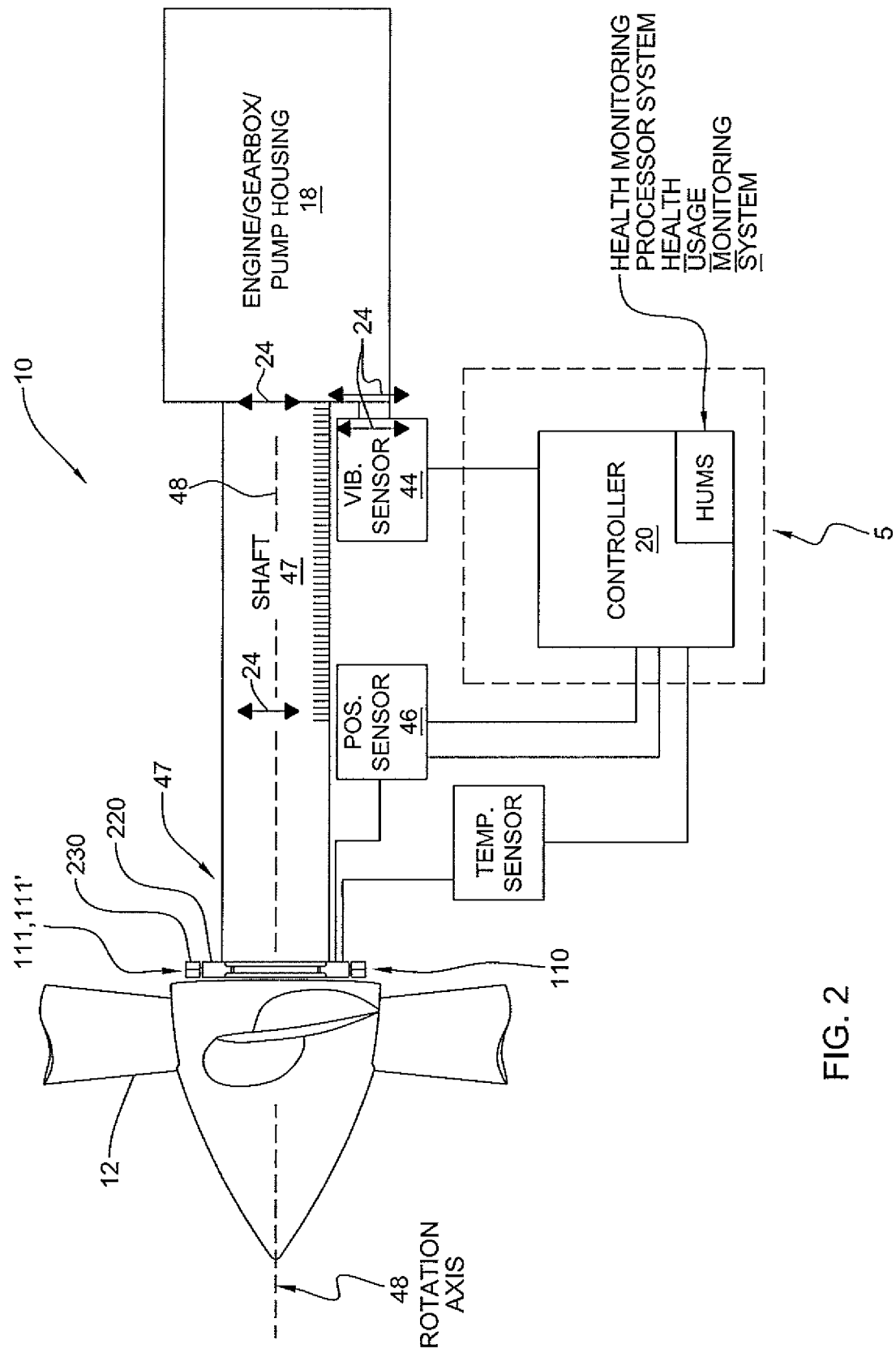
FIG. 2 illustrates a propeller balancing system.
Figure 3A:
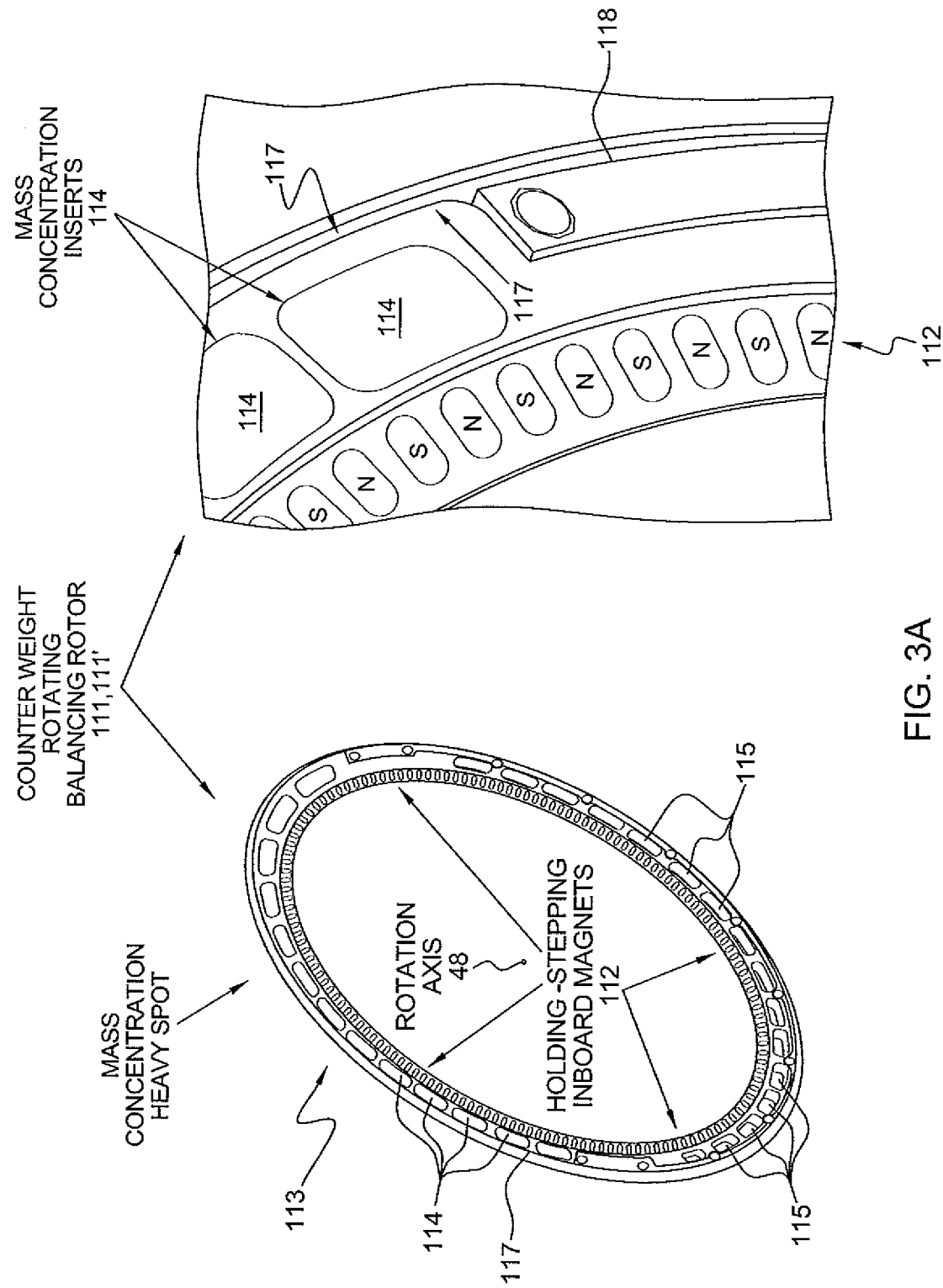
FIG. 3A-D illustrates counterweight rotating balancing rotors with holding stepping inboard magnets and outboard mass concentrations.
Figure 3B:
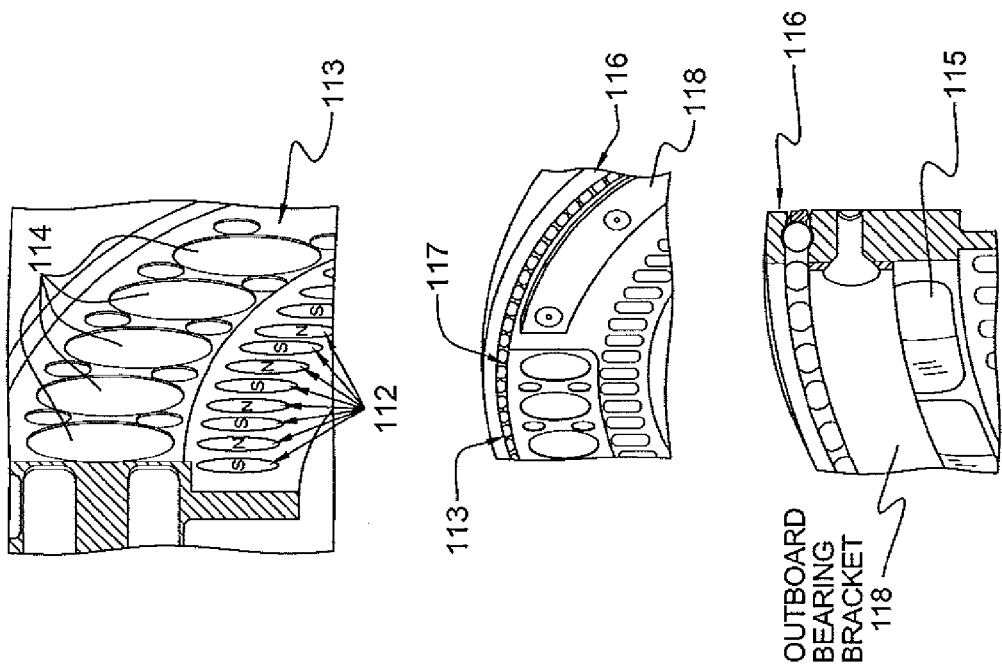
Figure 3B:
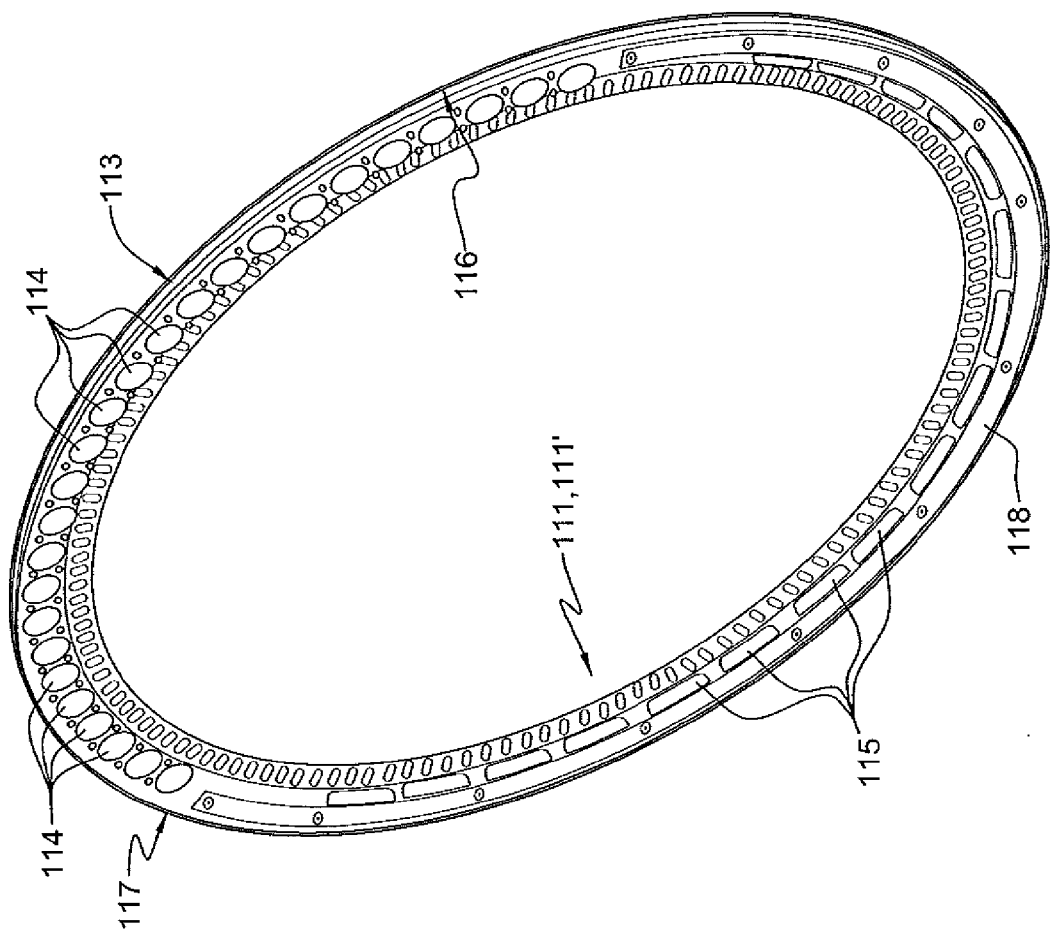
Figure 3C:
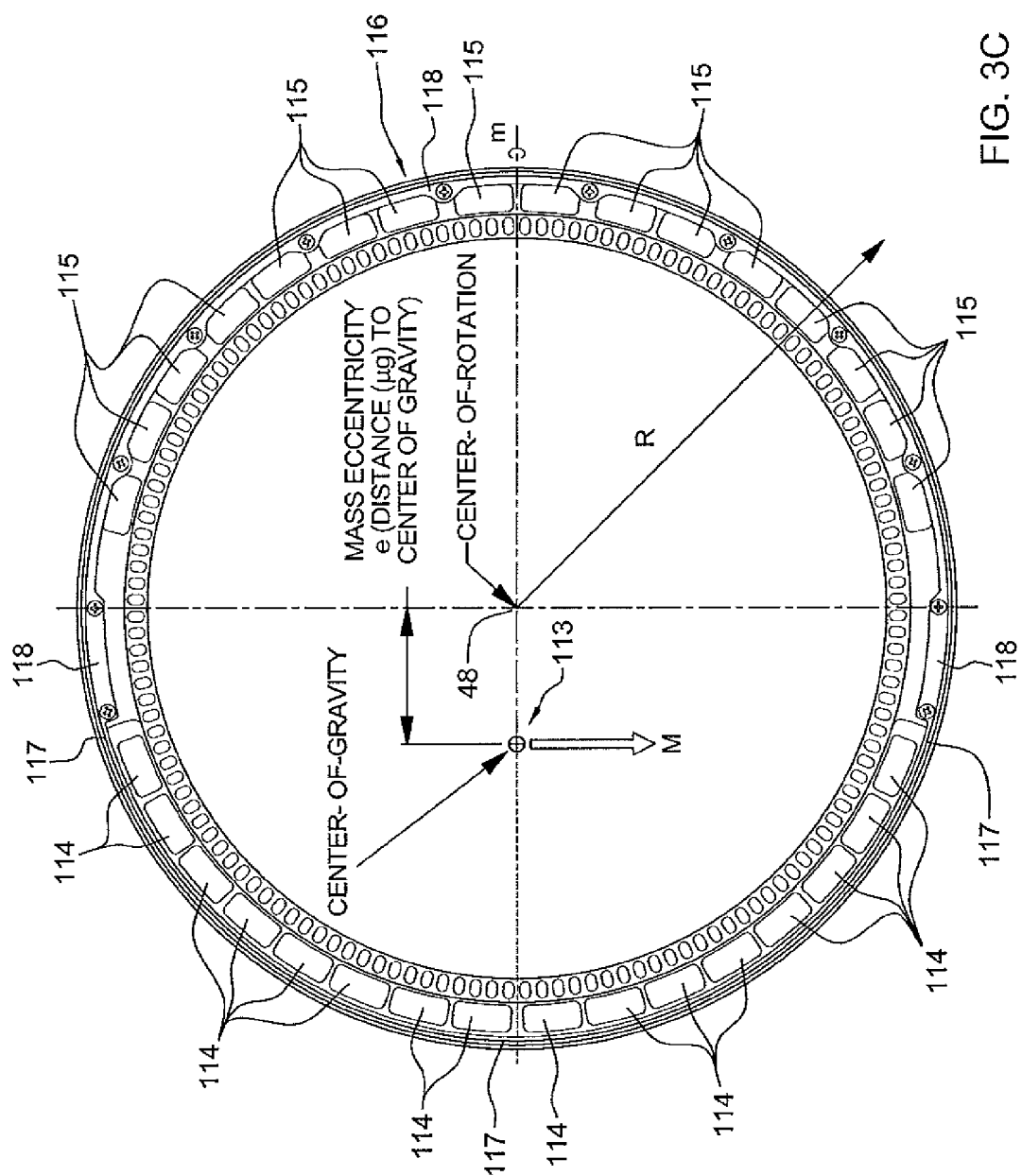
Figure 3D:
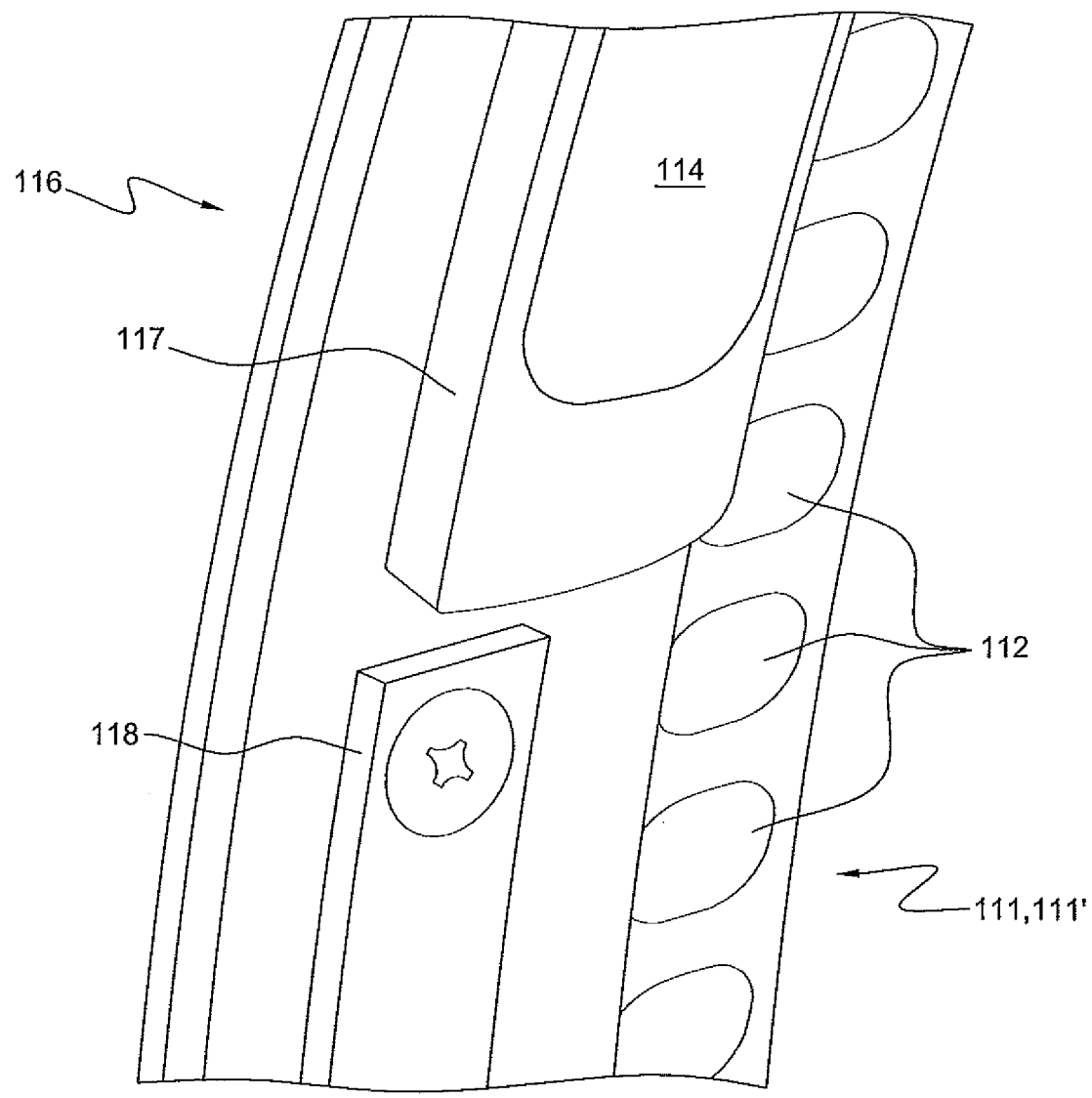

FIG. 2 shows an embodiment of the invention with an aircraft balancing system 10. Aircraft balancing system 10 is coupled to a propeller 12 that is rotated by a rotating machine member shaft 47 coupled to a propeller engine/gearbox 18. Propeller 12, shaft 47 and engine/gearbox 18 provide an aircraft propelling system 3 that produces motive power for the aircraft. As discussed above, in some instances, propeller 12 can become imbalanced.

As shown in FIG. 2, the balancing system 10 preferably includes at least a first control system 5 that includes one or more vibration sensors 44 for detecting an imbalance condition in a propeller 12 and propeller shaft 47. Preferably, the vibration sensors 44 are located on or proximate to the engine/gearbox 18, preferably with the vibration sensor comprised of an accelerometer radially oriented on the engine/gearbox 18 to measure a vibration 24 lateral to the shaft 47, preferably radially oriented vibration sensor 44 measuring lateral shaft vibration 24. The control system 5 preferably includes one or more position sensors 46 for detecting the positions of adjustable balancing counterweight rotating balancing rotors of the balancer assembly 110. Preferably, the position sensors 46 are located proximate to the balancer assembly 110 and proximate the adjustable balancing counterweight rotating balancing rotors whose counter weight rotational position is being measured, preferably with the position sensors 46 in the balancer assembly 110, preferably in the inboard electromagnetic coil driver 220, preferably Hall effect magnetic position sensors which are stationary with respect to the rotating machine member and mounted in close non-contacting proximity to the rotors, the output position sensor signals of the Hall effect device position sensors representative of shaft position and the positions of balancing ring rotors, magnetic position sensors producing a pulse that is proportional to the length of time that the particular position sensor is in proximity to the magnet targets located on the rotating members, with the rotating machine member shaft speed preferably computed by counting the rate of Hall effect sensor pulses caused by the passing rotating target, and angular position of each rotor relative to the rotating assembly measured by the phase shift between sensor pulses caused by magnetic targets on each rotor and pulses caused by the rotating magnetic target grounded to the rotating machine member shaft.

The propeller balancer assembly 110 preferably includes a plurality of balance correction rotating balancing rotors 111, 111' that are electromagnetically positional around the rotating machine member shaft 47 and the rotation axis 48. The positional rotating balancing rotors 111, 111' are weighted, and are selectively stepped and held with a pattern of inboard positioning magnets 112 to cooperatively correct an imbalanced condition of rotating propeller 12 and shaft 47.

Figure 4A:
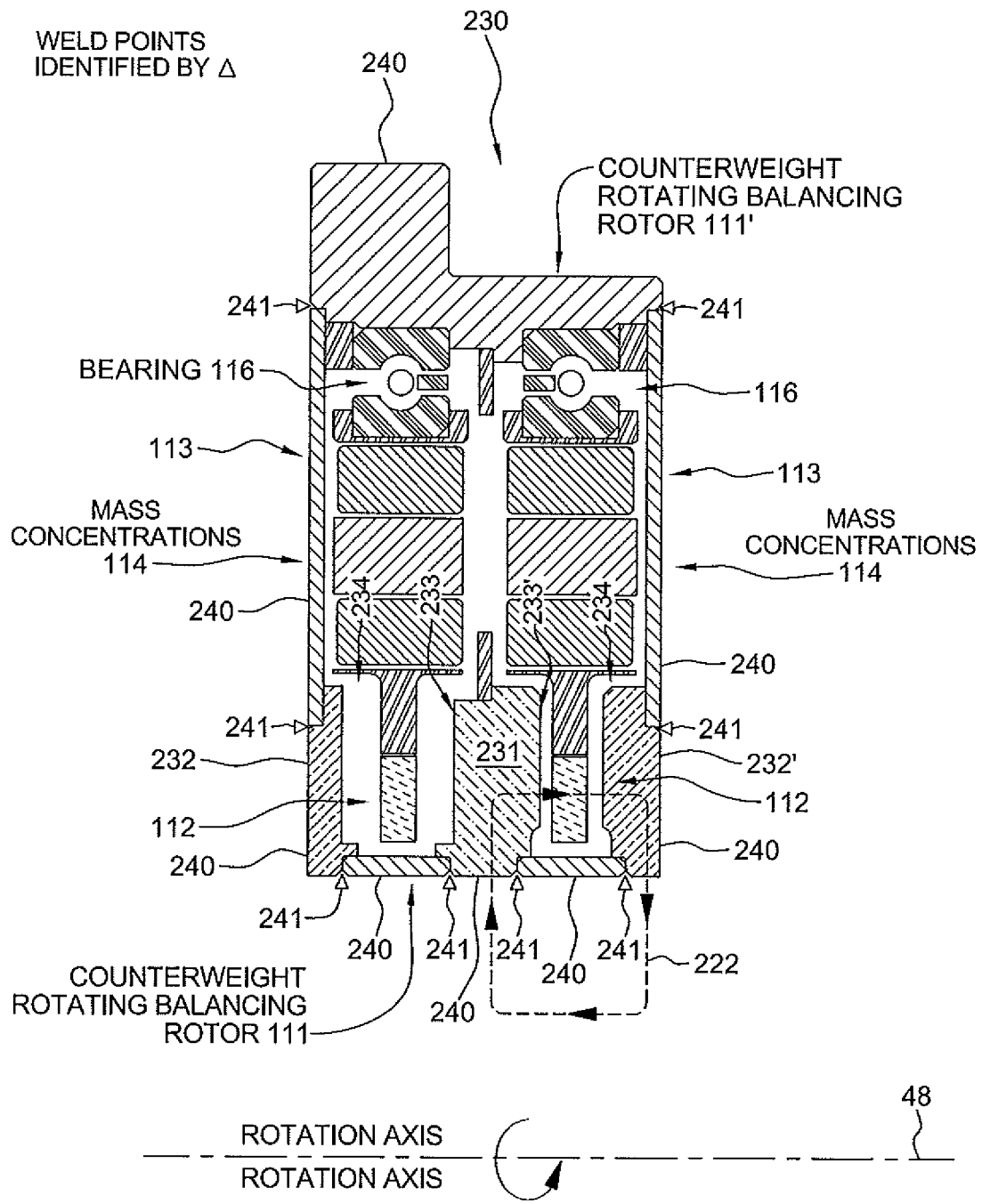
FIG. 4A-D show cross sections and internal details inside the electromagnetically actuated balancer assembly of a balancing system.
Figure 4B:
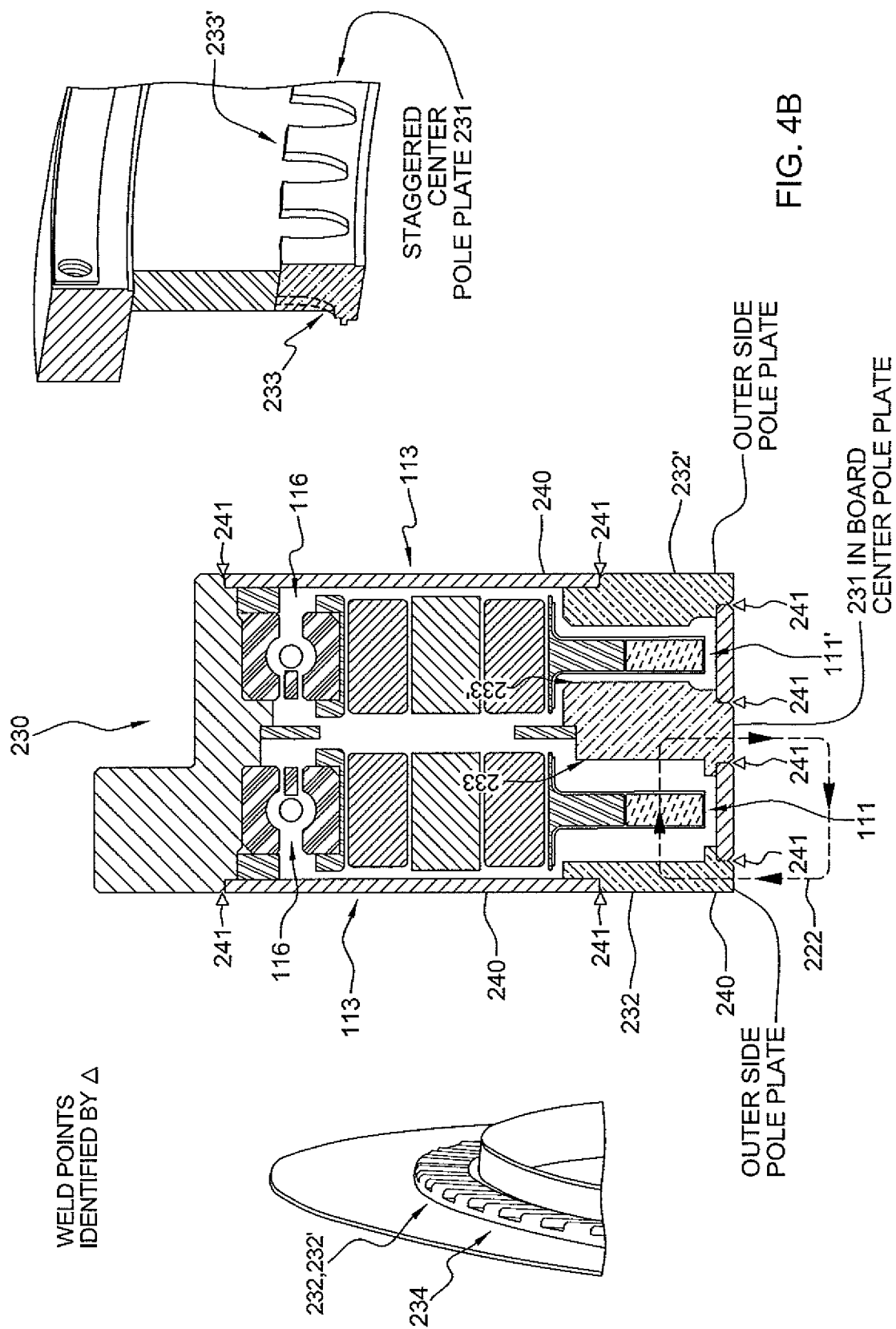
Figure 4C:
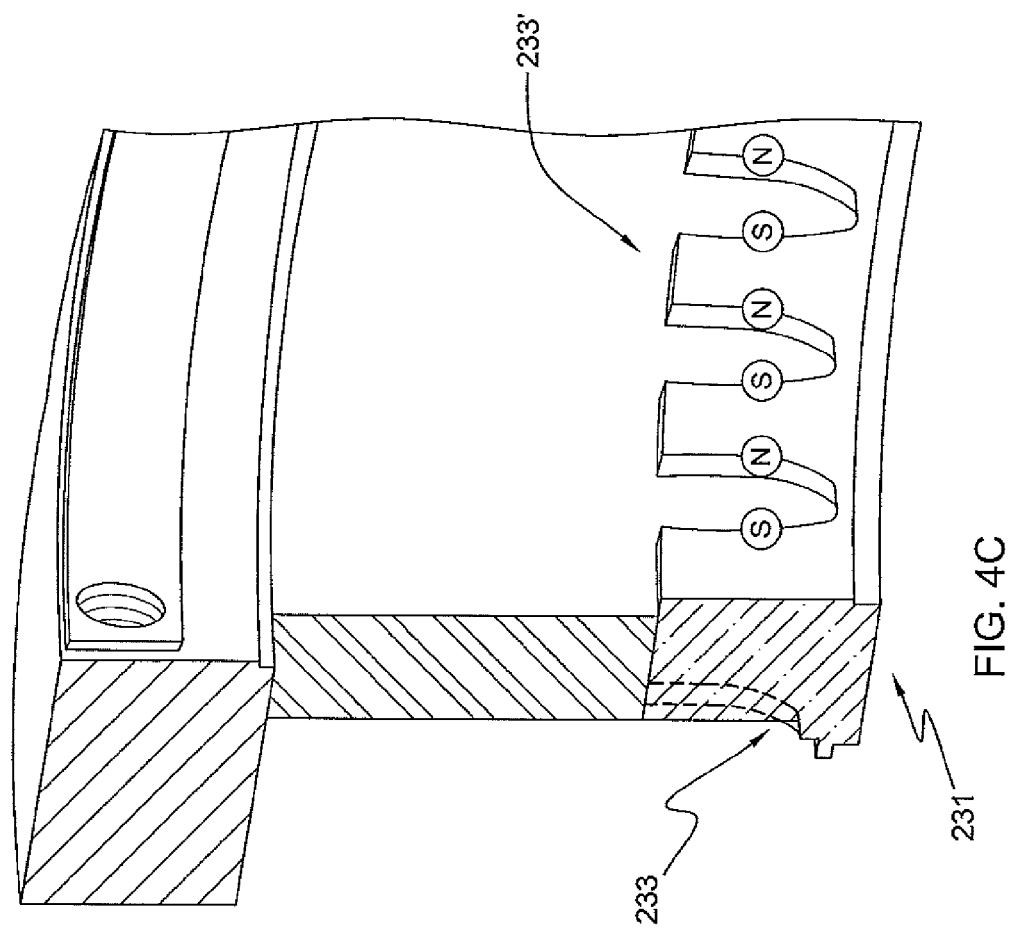
Figure 4D:
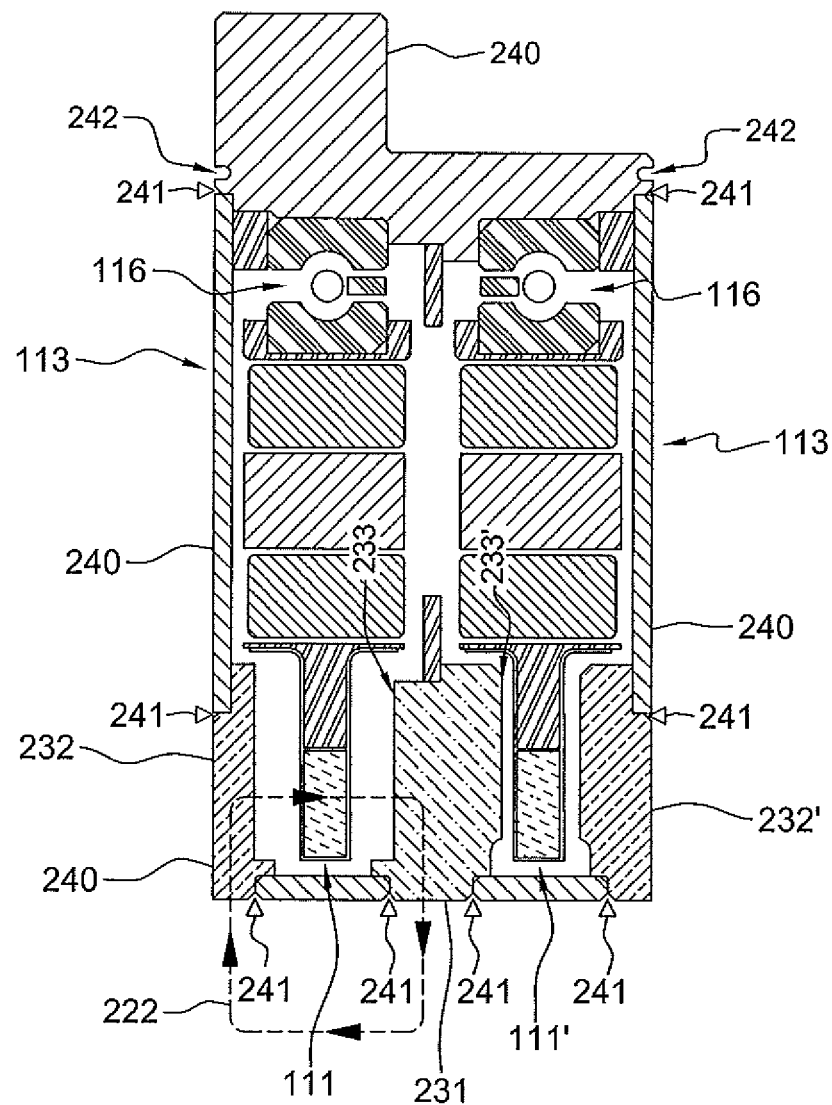
Figure 5:
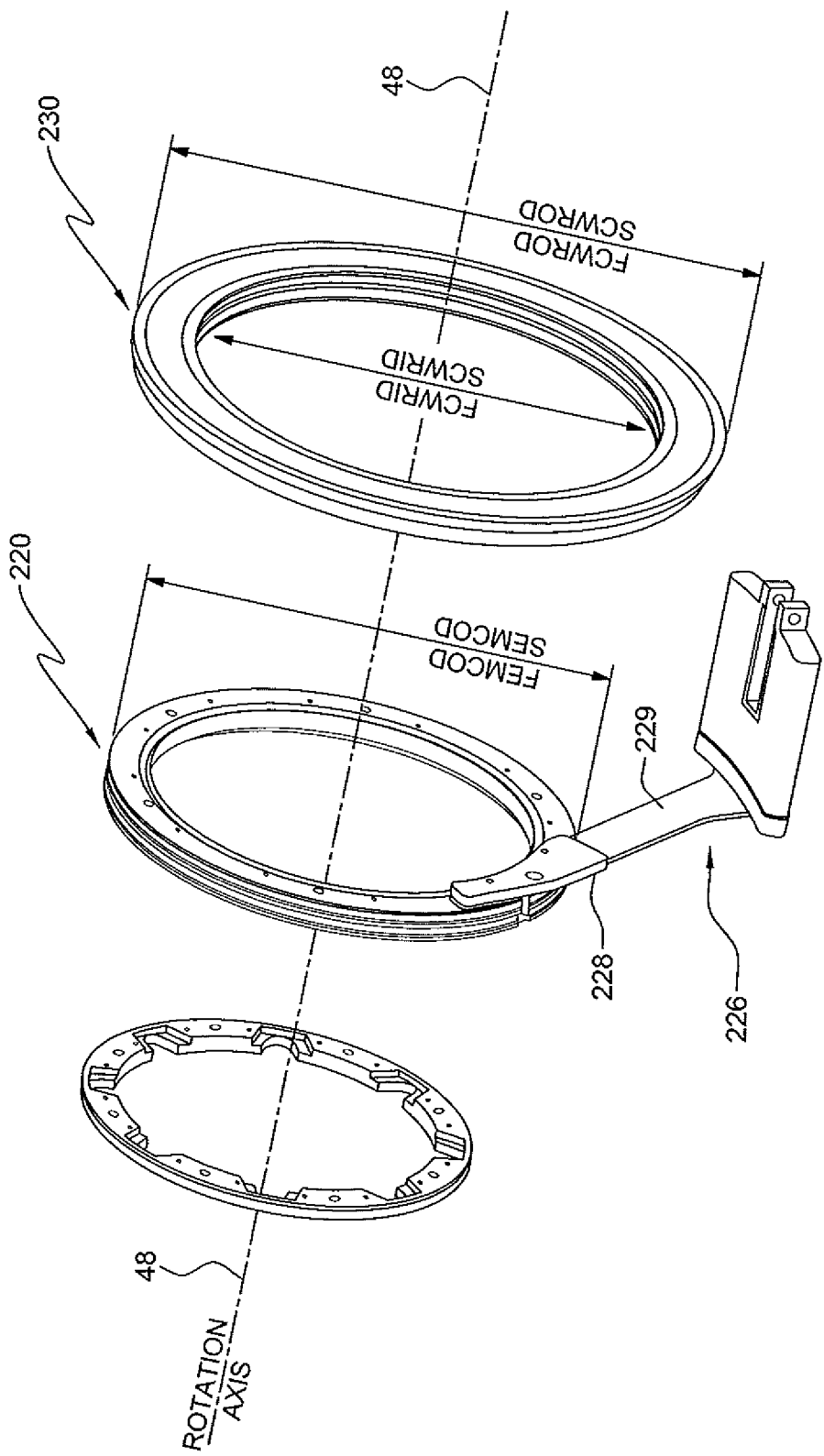
FIG. 5 illustrates the relationship in an electromagnetically actuated balancer of the inboard electromagnetic coil driver and the balancer casing containing counterweight rotating balancing rotors.
Figure 6A:
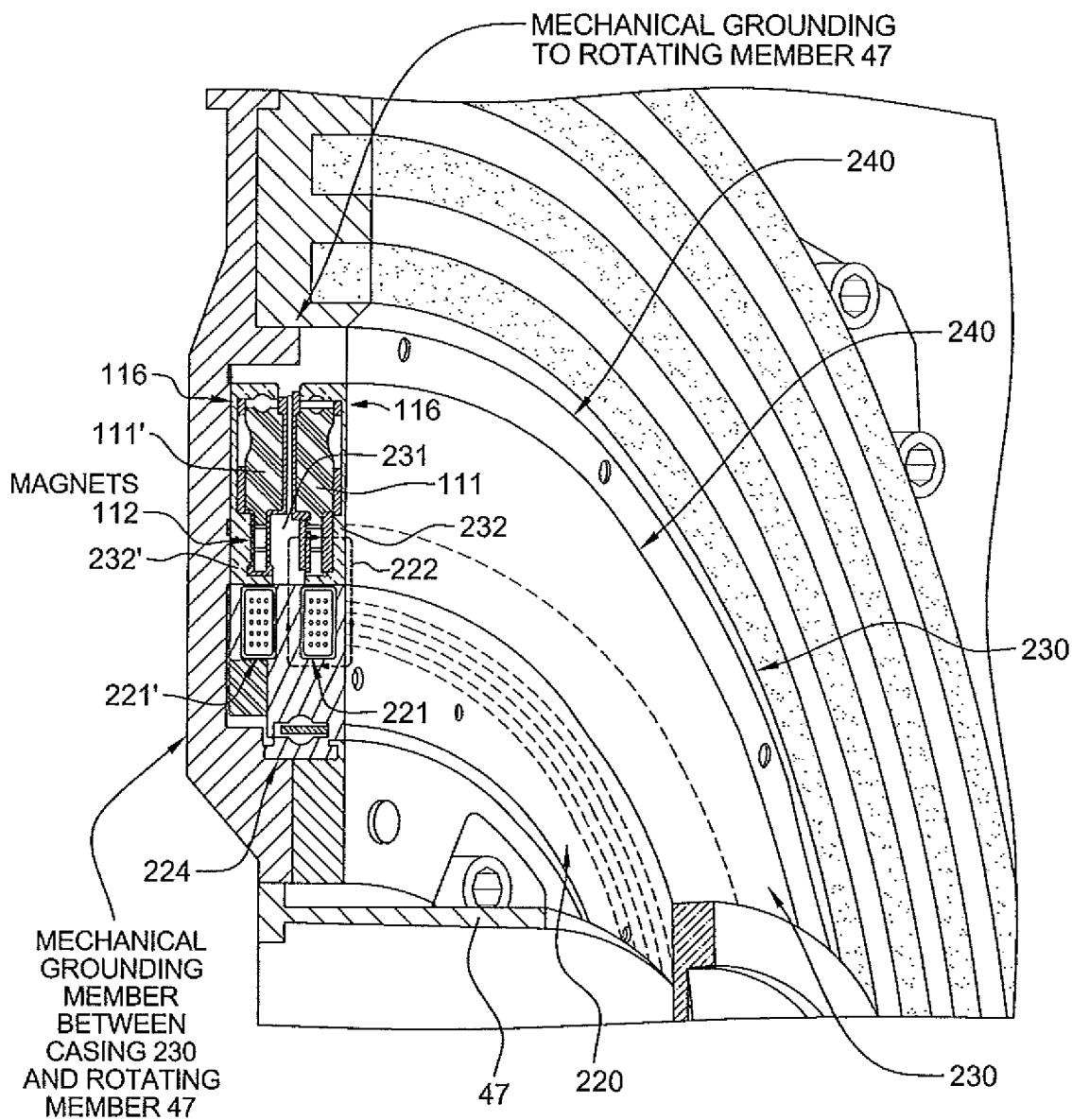
FIG. 6A-B show cross sections of a mounted electromagnetically actuated balancer assembly.
Figure 6B:
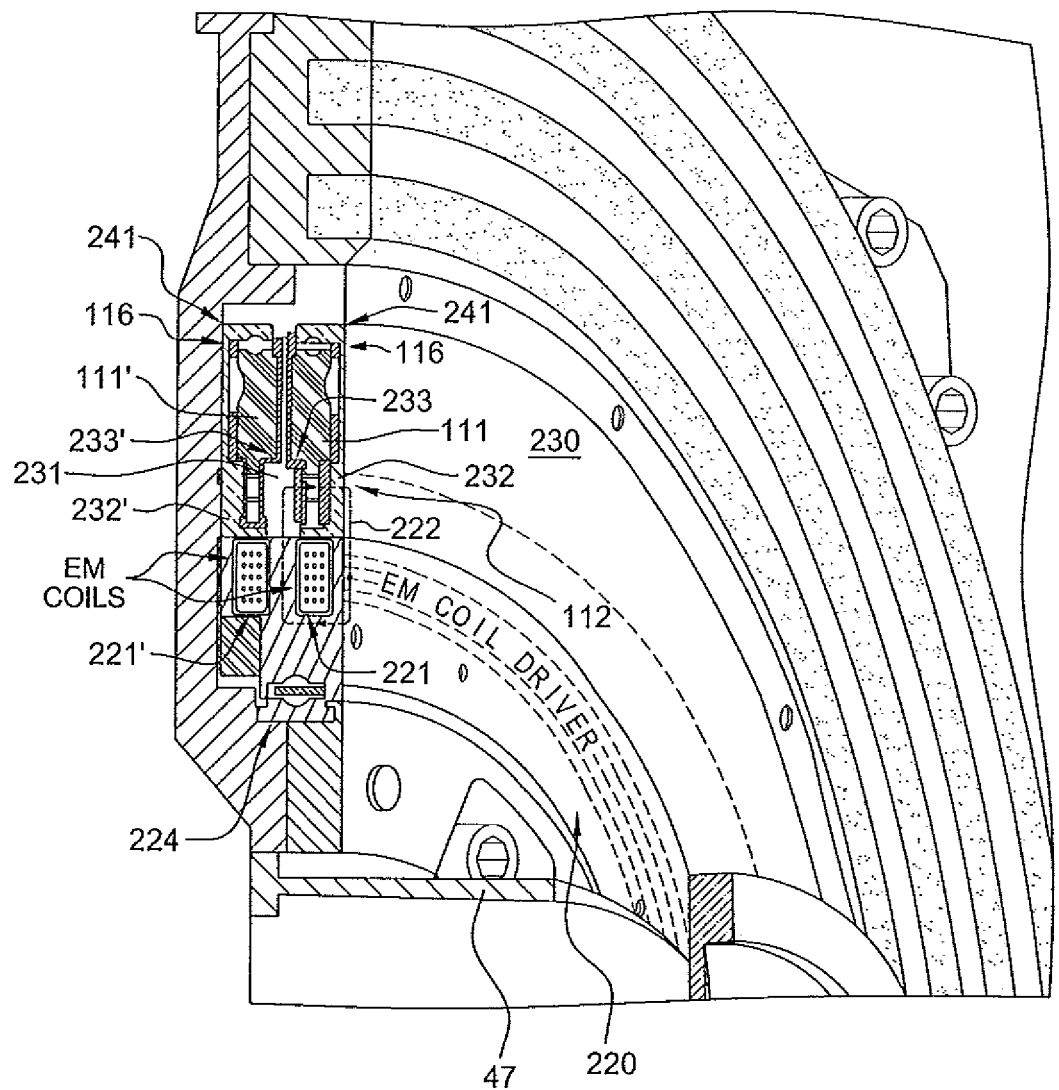
Figure 7A:
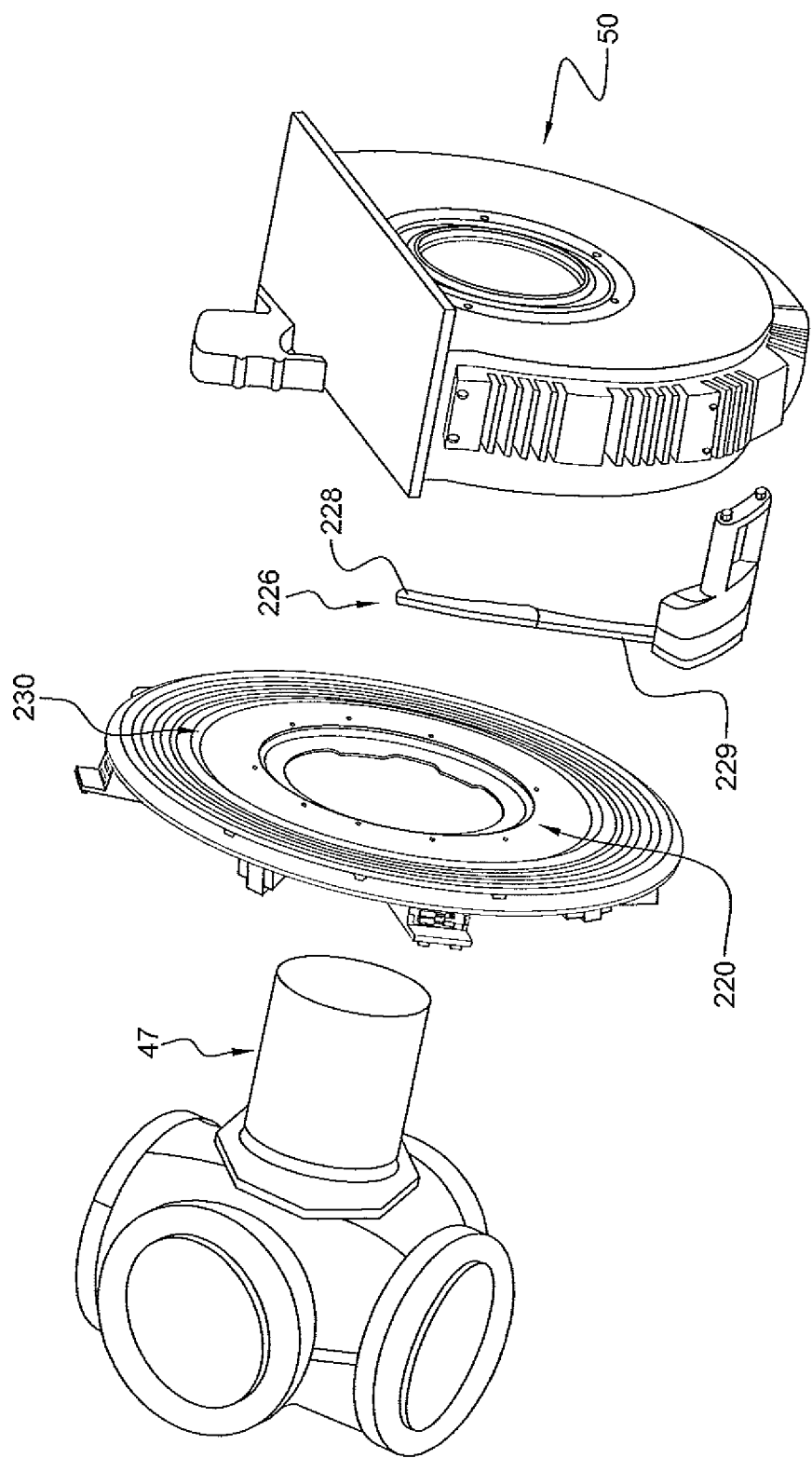
FIG. 7A-B show exploded views of an electromagnetically actuated balancer mounted between a nonrotating machine member and a rotating machine member.
Figure 7B:
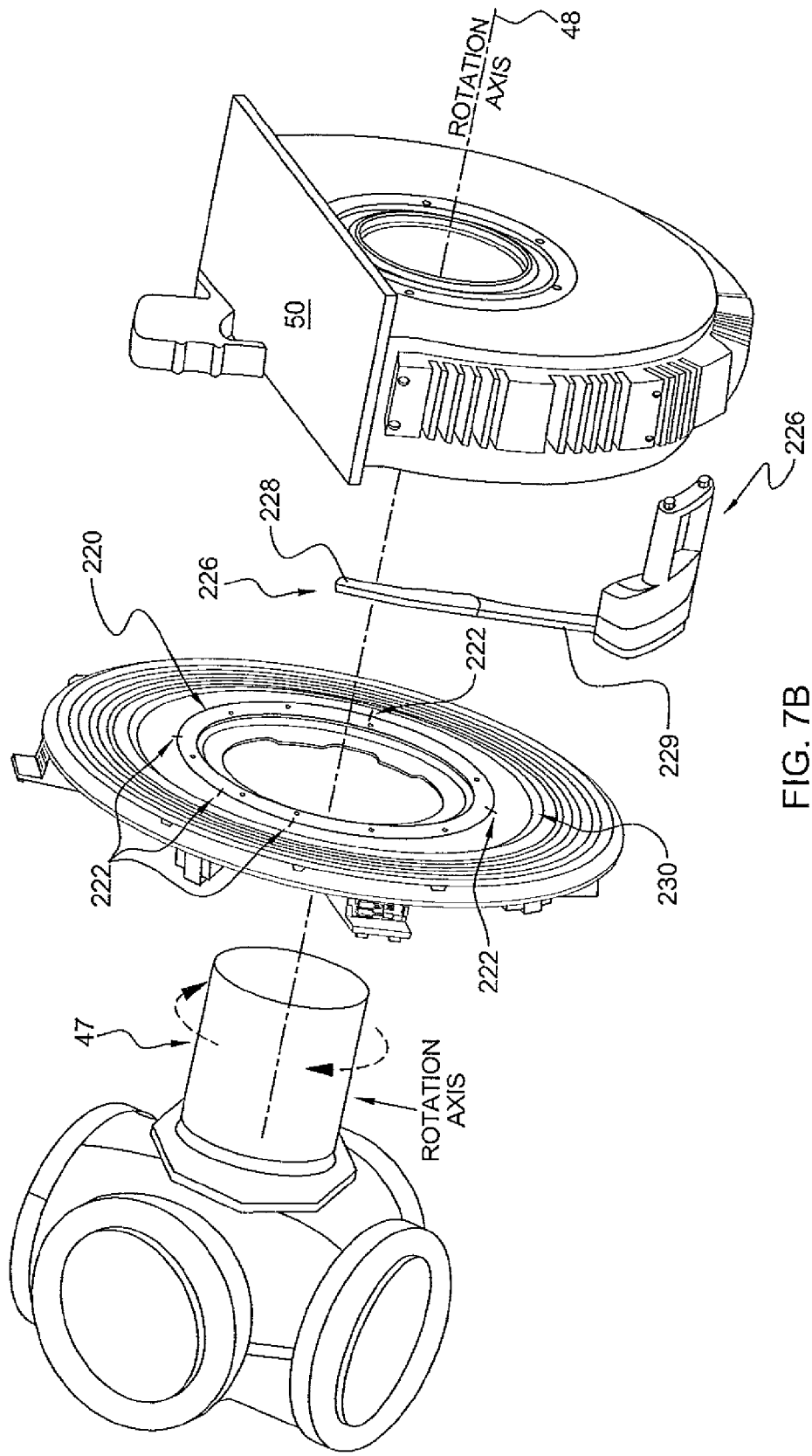
Figure 8A:
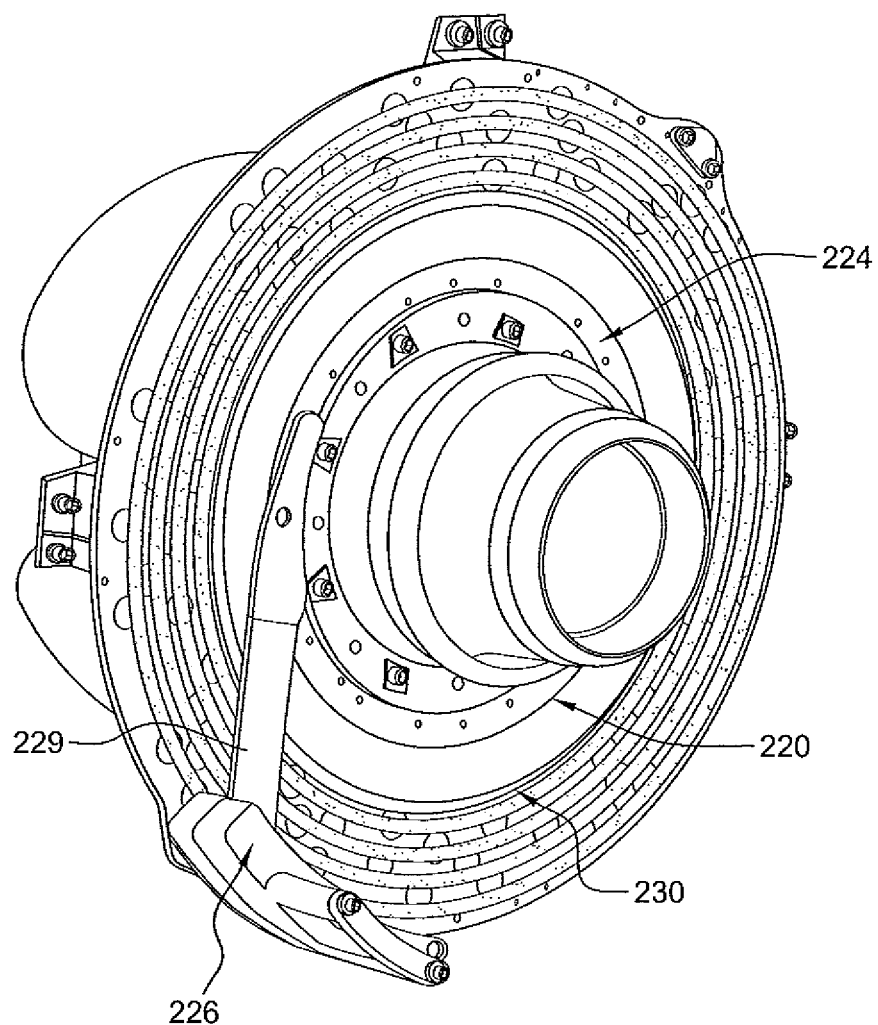
FIG. 8A-B illustrates an electromagnetically actuated balancer assembly on a rotating machine member.
Figure 8B:
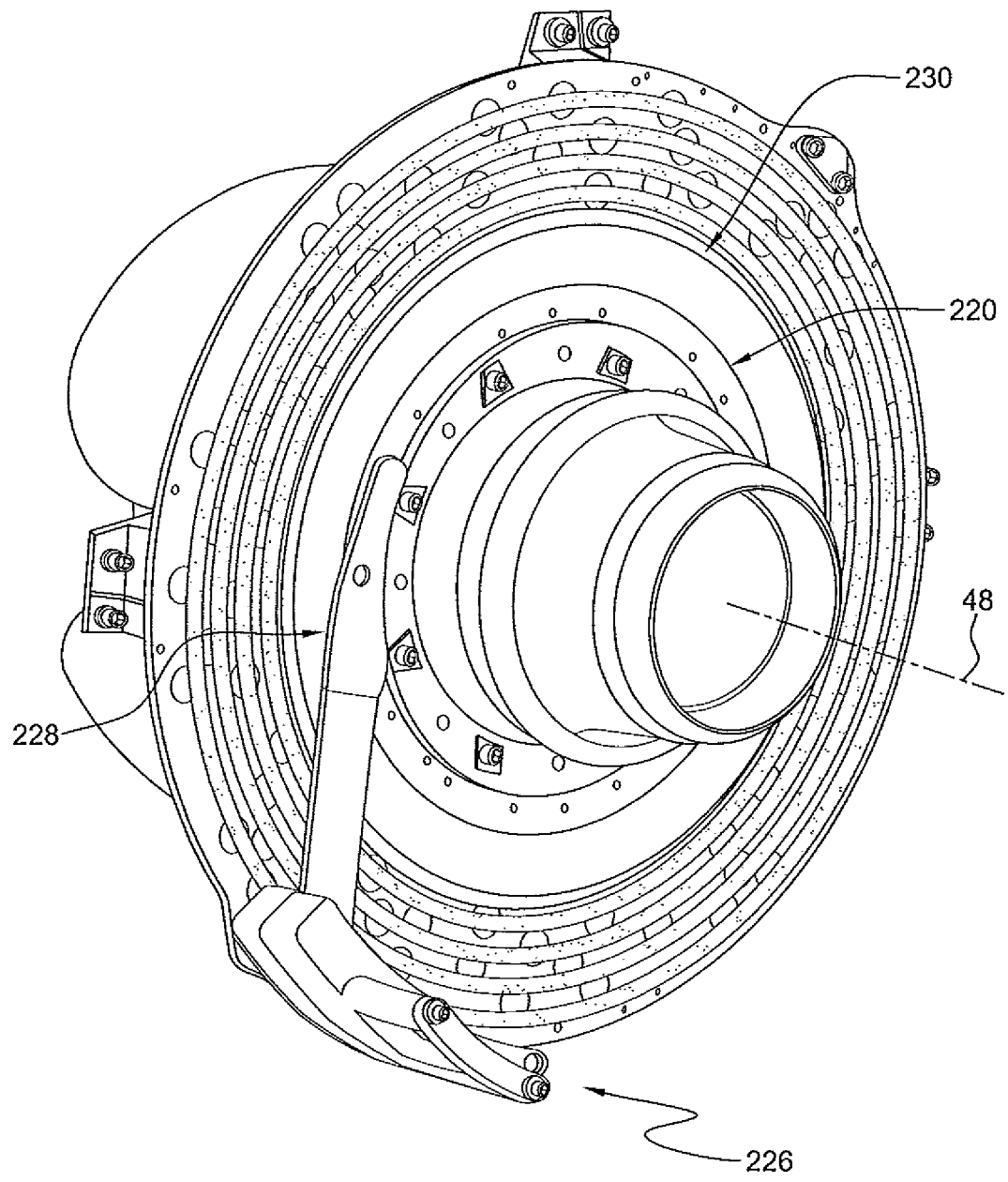
Figure 9A:
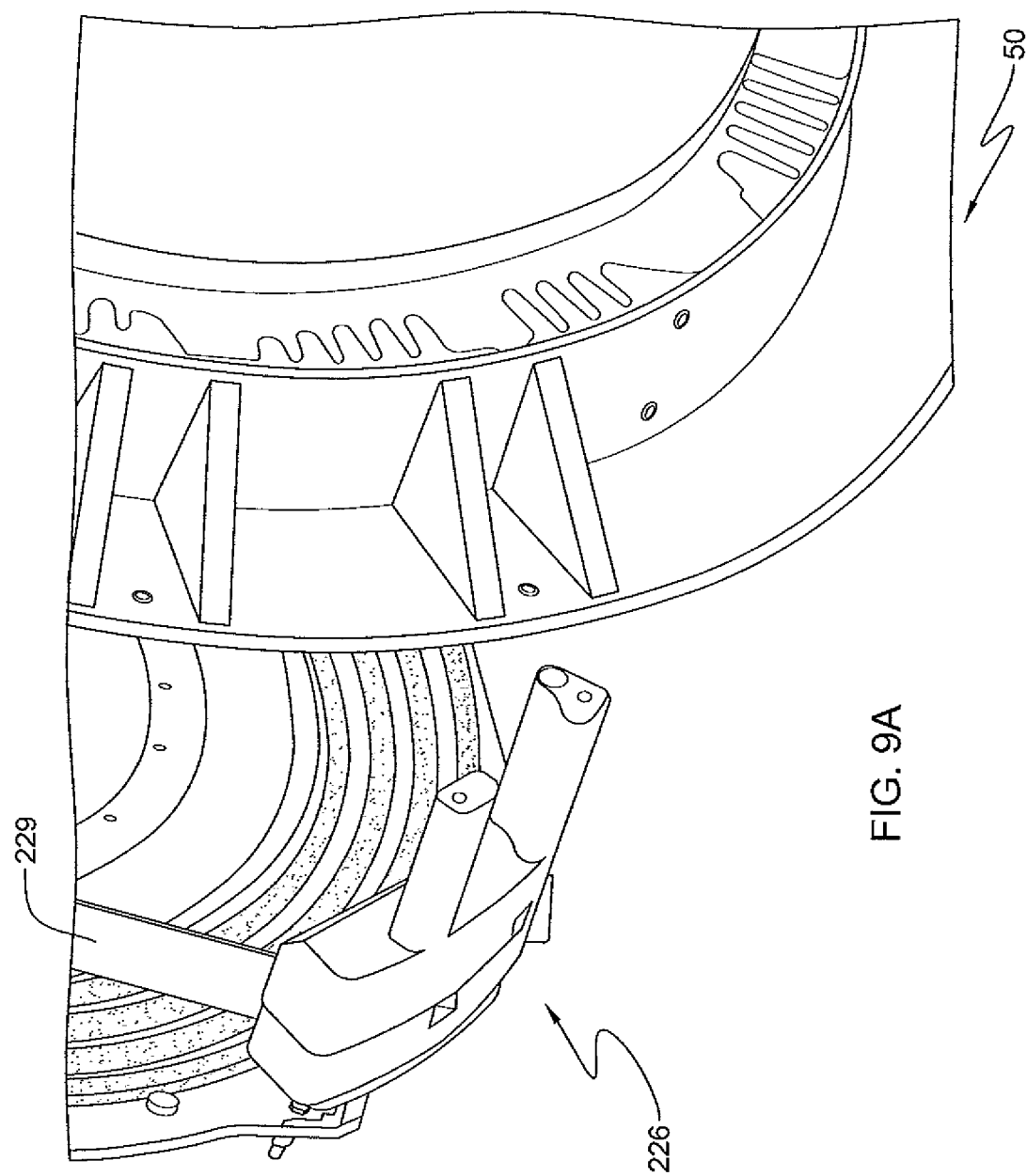
Figure 9B:
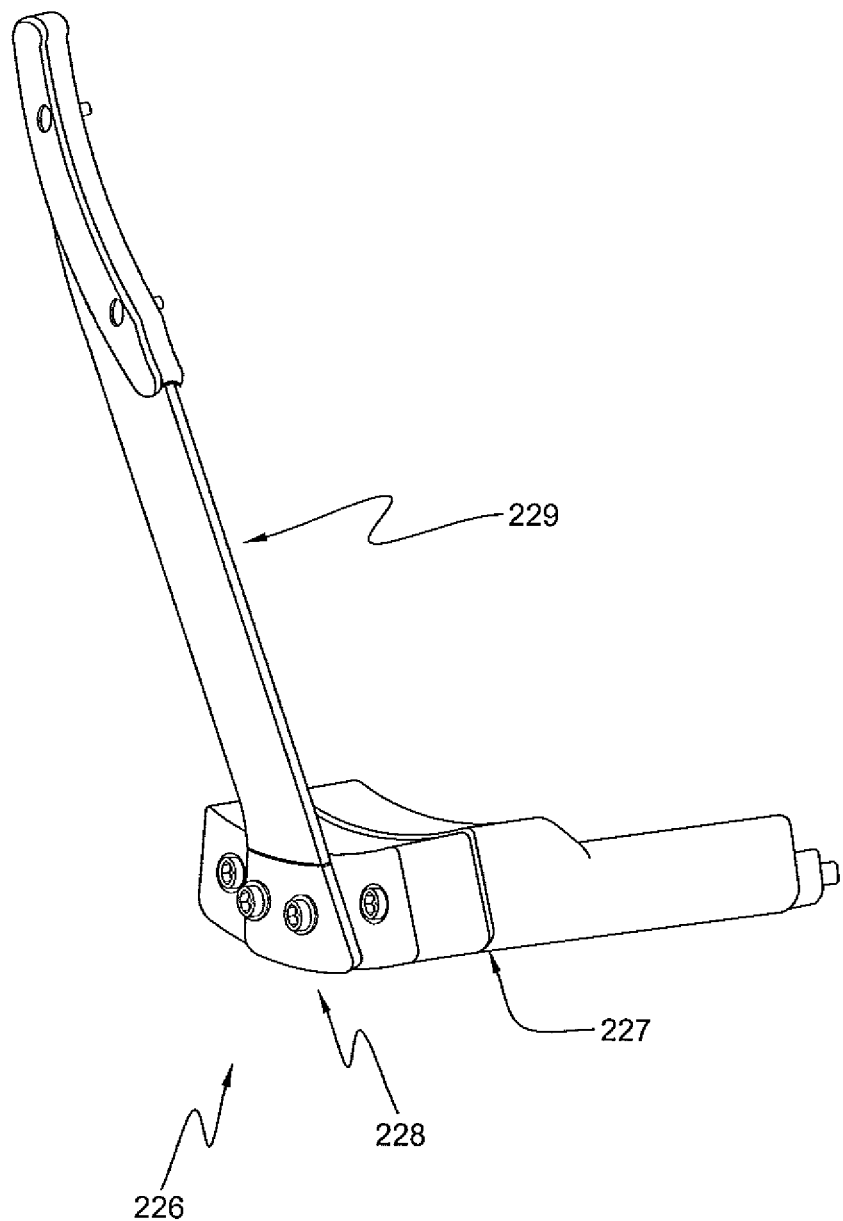
Figure 9D:
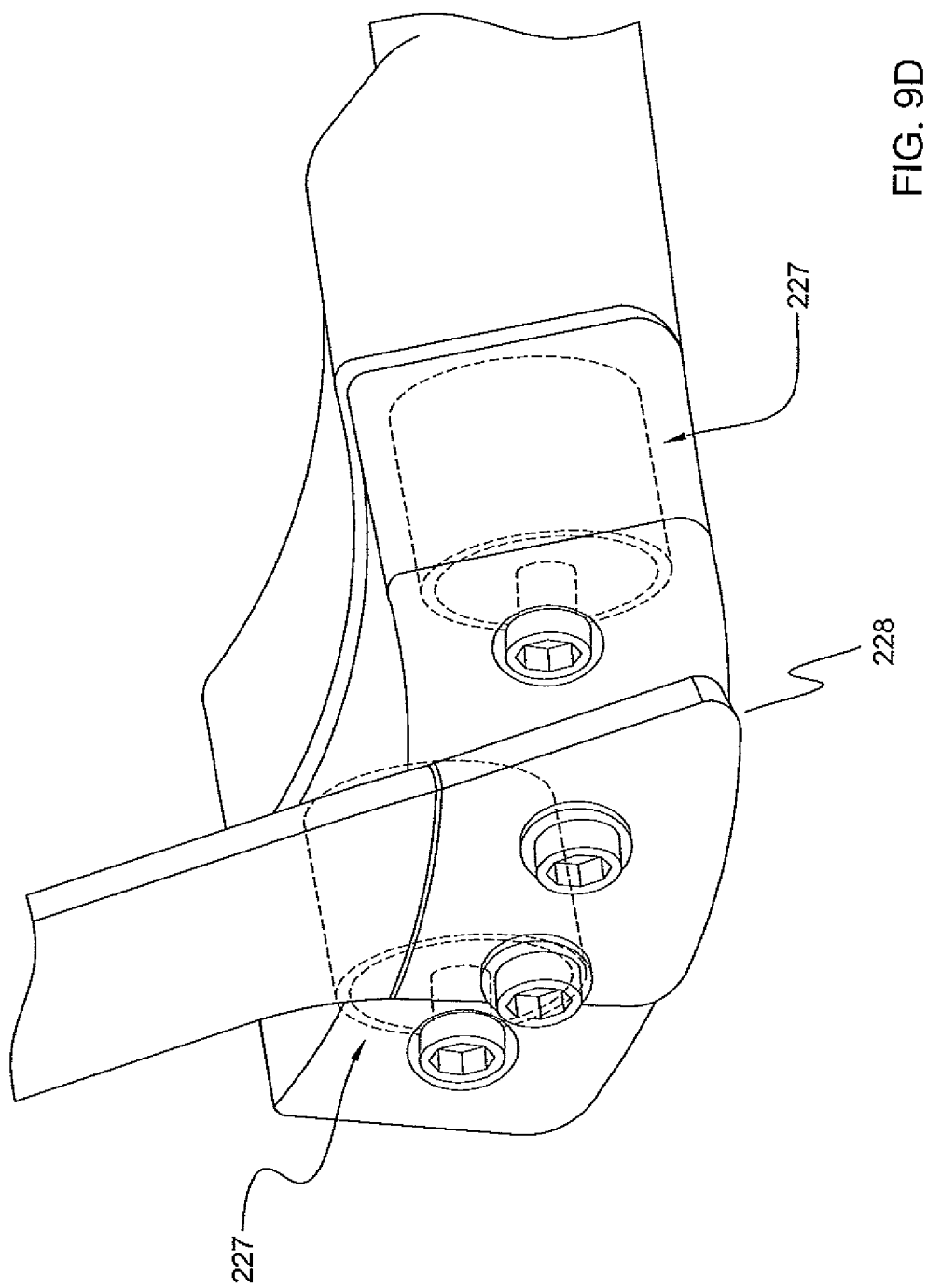
Figure 9E:
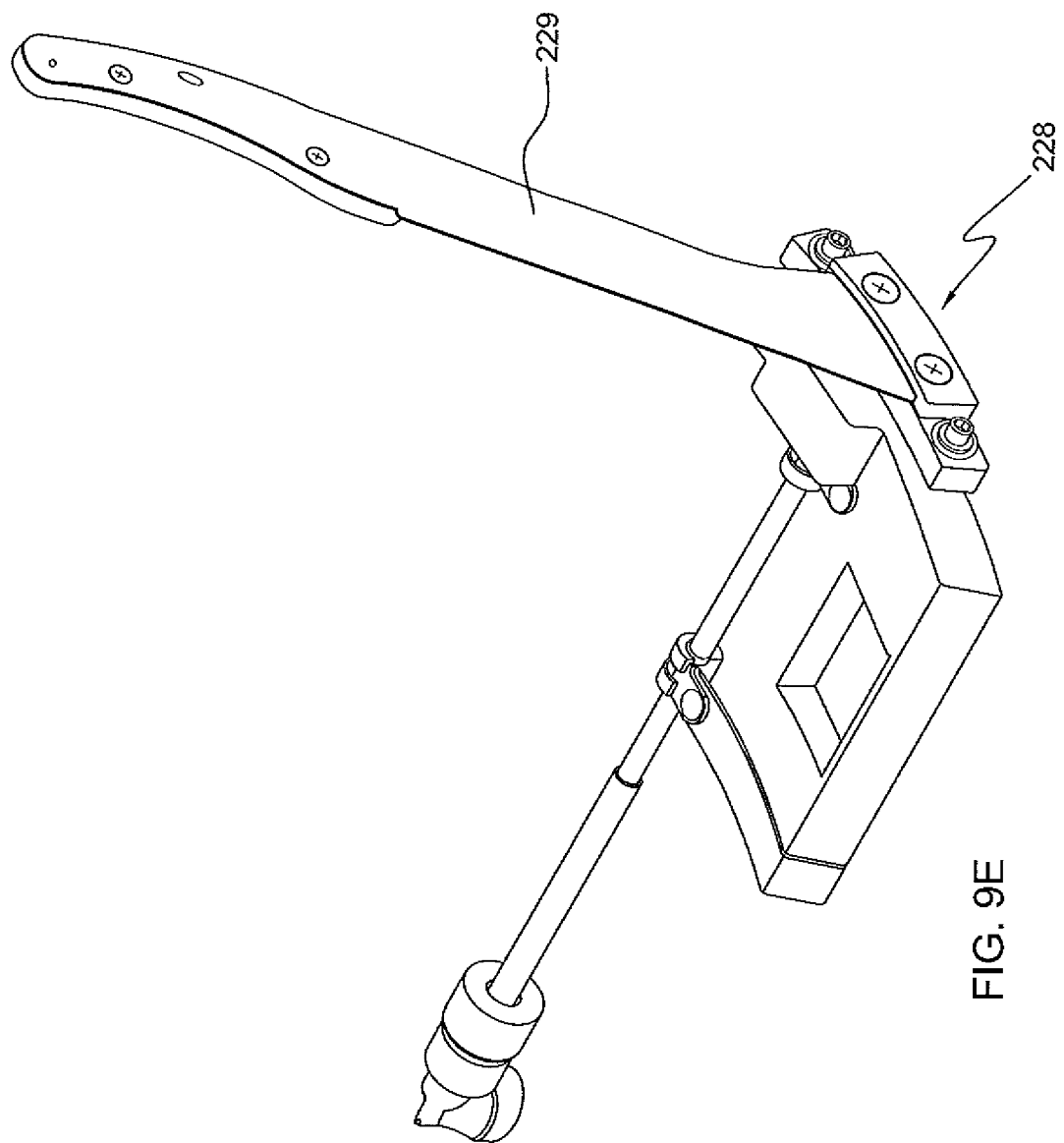
Figure 9F:
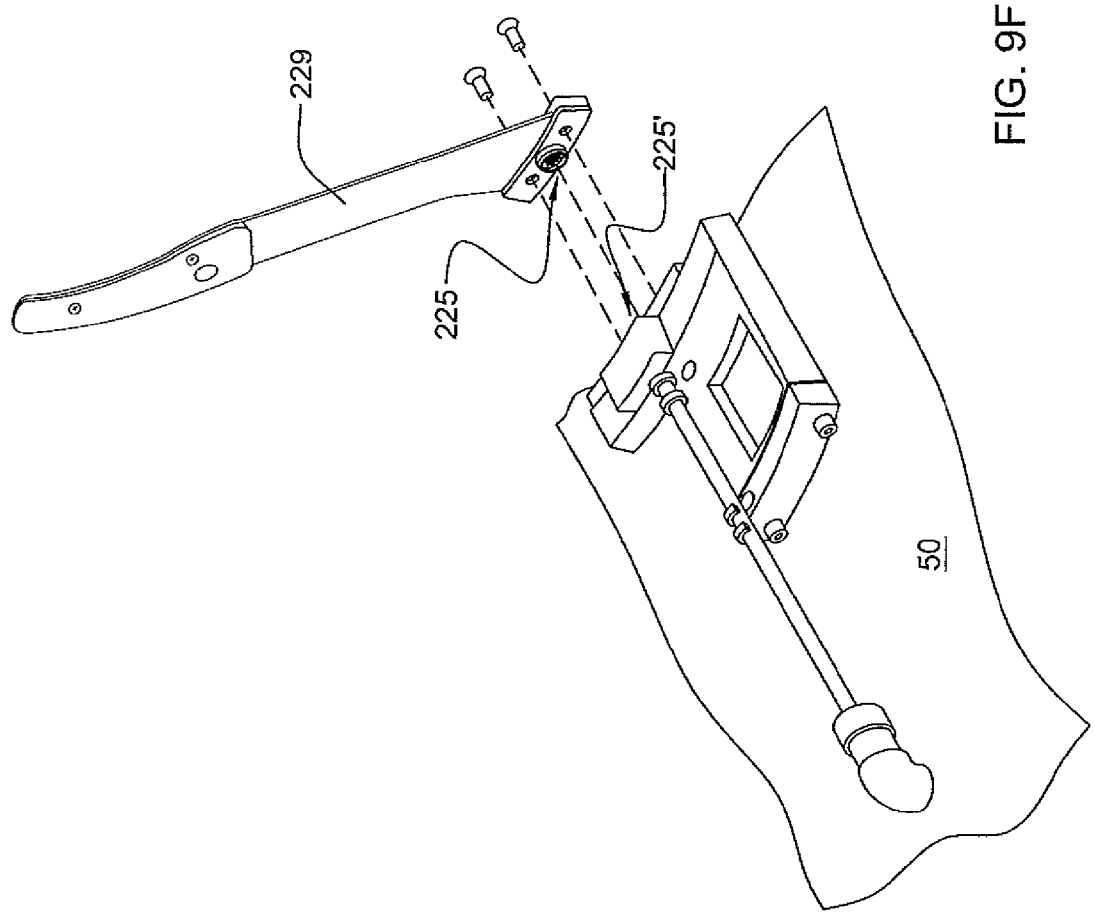
Figure 10A:
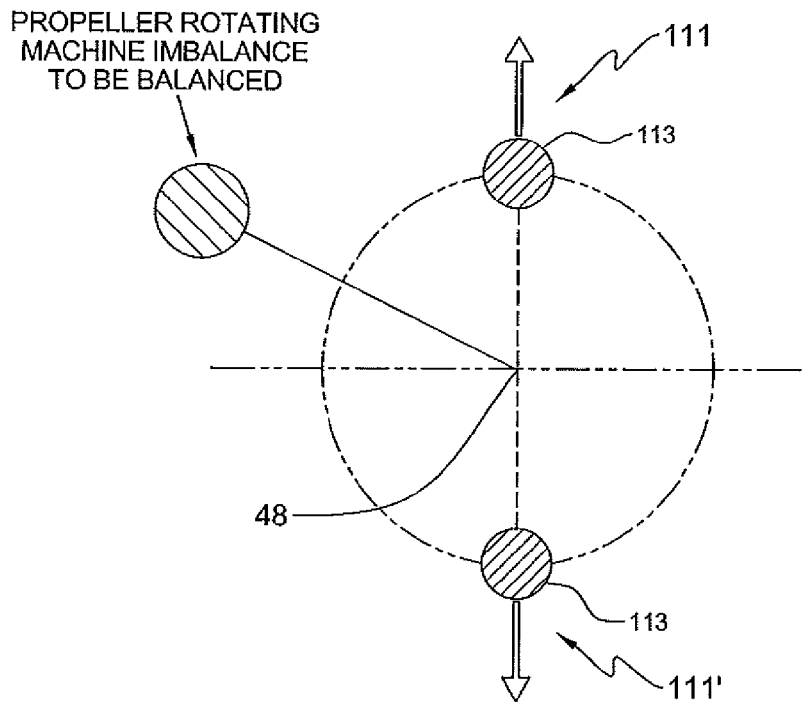
FIG. 10A-C illustrates methods of balancing propeller rotating machine imbalances.
Figure 10B:
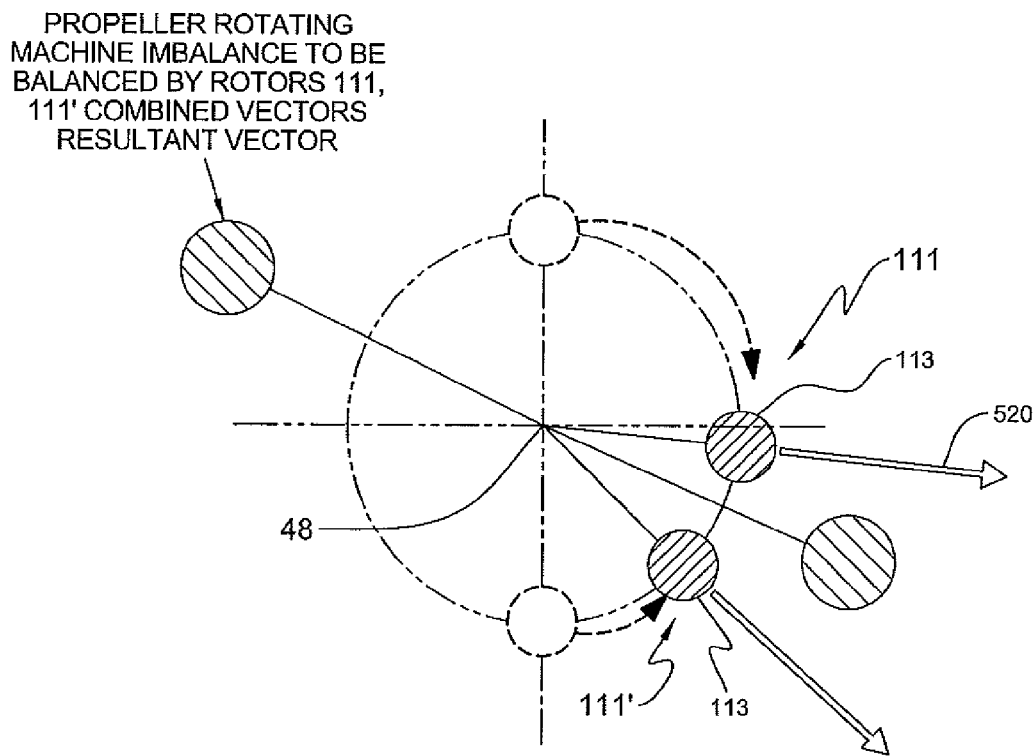
Figure 10C:
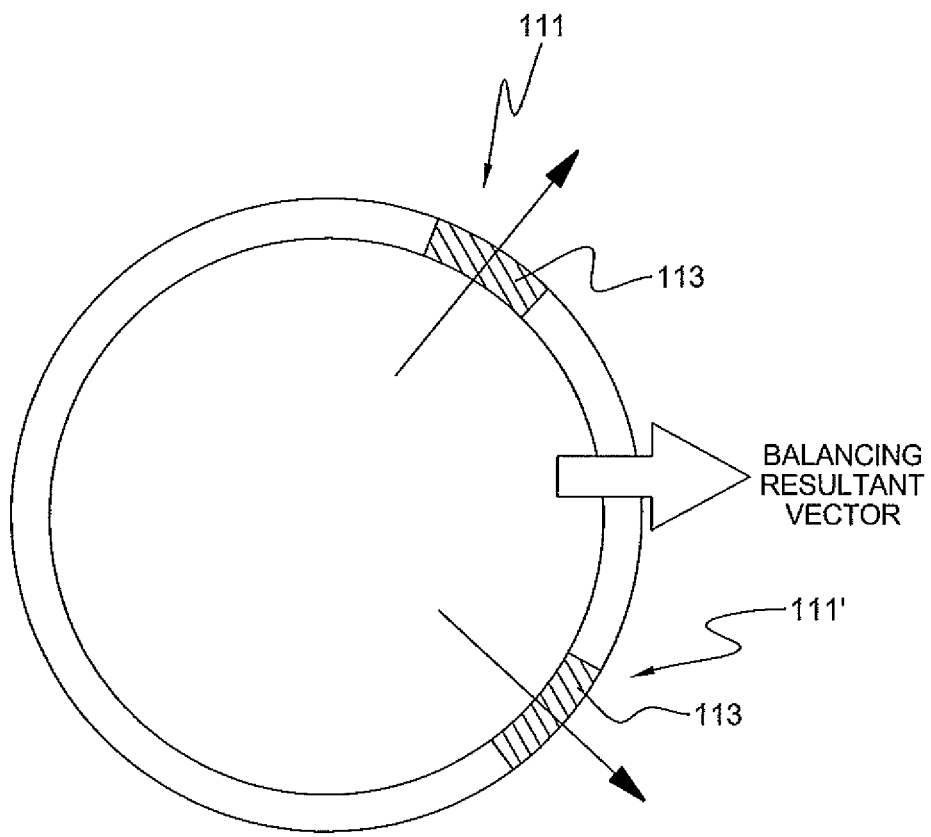

In an embodiment the invention includes a method of balancing an aircraft propeller system 3. The method preferably includes providing an aircraft propeller system 3 with a rotating machine propeller shaft member 47 which rotates around a rotation axis 48. The method preferably includes providing a first counterweight rotating balancing rotor 111, the first counterweight heavy spot mass concentration balancing rotor including a first plurality of holding stepping inboard magnets 112. FIG. 3 illustrates counterweight rotating balancing rotors 111, 111', the counterweight heavy spot mass concentration balancing rotor 111 preferably including a first plurality of holding stepping inboard magnets 112. Preferably the inboard magnets 112 are noncircular magnets, preferably longitudinally extending magnets. Preferably longitudinally extending magnets 112 extend normal to the rotation axis 48. Preferably the longitudinally extending magnets 112 extend and are elongated and aligned with radii extending out from the rotation axis 48. Preferably the first counterweight heavy spot mass concentration balancing rotor 111 includes a first outboard heavy spot mass concentration 113. FIG. 3 illustrates counterweight rotating balancing rotor 111, 111' with a heavy spot mass concentration 113, preferably provided from relatively high density mass concentration inserts 114 and opposing mass voids 115. FIG. 4 illustrates a cross-section of first and second counterweight rotating balancing rotors 111, 111' in a welded casing, with the rotors movably positionable around the rotation axis 48 of a rotating machine member with the rotors including a plurality of patterned oriented inboard magnets 112 for electromagnetically actuated rotational movement around the rotation axis 48 of the rotating machine member for which the balancer is mounted. Preferably the outboard heavy spot mass concentrations 113 and the mass concentration inserts 114 and mass voids 115 are distal from the rotation axis 48 and the holding stepping inboard magnets 112 are proximate the rotation axis 48. The method preferably includes providing a second counterweight rotating balancing rotor 111', the second counterweight heavy spot mass concentration balancing rotor 111' including a second plurality of holding stepping inboard magnets 112 and a second outboard heavy spot mass concentration 113. The rotors 111, 111' are movably disposed upon the rotating machine member with the plurality of magnets 112 disposed inboard of the mass concentrations 113 and proximate the rotation axis 48 with the magnet pattern providing for electromagnetically actuated stepped rotational movement around the rotation axis 48 of the rotating machine member 47 for which the balancer is mounted. Preferably the outboard heavy spot mass concentrations 113 are distal from the rotation axis 48 as compared to the holding stepping inboard magnets 112 proximate the rotation axis 48. The method preferably includes providing an inboard nonrotating electromagnetic coil driver 220, the inboard electromagnetic coil driver 220 including a first inboard electromagnetic coil 221 proximate the rotation axis 48, and a second inboard electromagnetic coil 221' proximate the rotation axis 48, preferably with the inboard electromagnetic coils 221, 221' comprised of wound electrical conductors, preferably electrical conductor wires wound around a center oriented with the axis 48. FIG. 4C illustrates relationship of the relation of the pole patterns 233, 233' of the center pole plate 231 to the north (N) and south (S) poles of the magnets 112 with the strong magnetic holding field of the magnets set up through and corresponding to the thick parts of the pole plate pattern compared to the thinned out parts of the pattern, and then when a timed quick short duration controlled magnetic field is generated by the proximate coil 221' with magnetic polarity generated in the thick parts of the pole pattern such that the S south pole of a magnet 112 is repelled by the proximate south pole generated in the thick part of the pole plate pattern by the EM coil controlled magnetic field and attracted by the north pole generated by the EM coil controlled magnetic field on the opposite side of the thinned part valley in the pattern with the rotor 111' magnetically stepped across this pole pattern thinned part valley. When the timed quick short duration controlled magnetic field is terminated with the controlled ending of current supply to the EM coil the rotor is again held by the magnetic holding field of the magnets set up through and corresponding to the thick parts of the pole plate pattern. With the controlled generation of such magnetic fields by the EM coil the rotor 111' and rotor 111 are stepped and rotated relative to the pole plate along the pole patterns 232, 233', 234. FIG. 5 illustrates an inboard nonrotating EM coil driver 220 with a relatively smaller diameter for noncontactingly fitting concentrically inside a balancer casing 230 containing the counterweight rotating balancing rotors 111, 111'. FIG. 6 illustrate the inboard electromagnetic coil driver 220 with the first and second inboard electromagnetic coils 221, 221' proximate the rotation axis 48. The method preferably includes disposing the inboard nonrotating electromagnetic coil driver 220 and the first counterweight balancing rotor 111 and the second counterweight balancing rotor 111' around the rotating machine propeller shaft member 47 with the first inboard electromagnetic coil 220 proximate the first inboard magnets 112 of the first counterweight balancing rotor 111, the inboard nonrotating electromagnetic coil driver 220 proximate the rotation axis 48 and the first counterweight balancing rotor 111 outboard of the inboard nonrotating electromagnetic coil driver 220 and distal from the rotation axis 48, with the first inboard electromagnetic coil 221 generating a electromagnetic field 222 when energized with an electrical current to electromagnetically step the first inboard magnets 112 of the at least first counterweight balancing rotor 111 to electromagnetically actuate rotational movement of the first counterweight heavy spot mass concentration balancing rotor 111 around the rotation axis 48 of the rotating machine member 47 and relative to the inboard nonrotating electromagnetic coil driver 220. FIGS. 6 and 7 illustrate the position and orientation of the inboard nonrotating electromagnetic coil driver 220 and the outboard counterweight heavy spot mass concentration balancing rotors 111, 111'. The second inboard electromagnetic coil 221' is preferably proximate the second counterweight balancing rotor 111', with the second inboard electromagnetic coil 221' proximate the second inboard magnets 112 of the second counterweight balancing rotor 111', wherein the second inboard electromagnetic coil 221' generates an electromagnetic field 222 to electromagnetically step the second inboard magnets 112 of the second counterweight balancing rotor 111' to electromagnetically actuate rotational movement of the second counterweight heavy spot mass concentration balancing rotor 111' around the rotation axis 48 and relative to the inboard nonrotating electromagnetic coil driver 220.

Preferably the inboard electromagnetic coil driver 220 includes a plurality of inboard bearing members 224, and the method includes rotationally supporting the inboard nonrotating electromagnetic coil driver 220 upon the rotating machine propeller shaft member 47 with the inboard bearing members 224. Preferably the EM coil driver 220 support bearing members 224 support the nonrotating coil driver 220 around the rotating machine member. Preferably the method includes restraining the inboard electromagnetic coil driver 220 from rotating around the rotation axis 48. Preferably restraining the inboard electromagnetic coil driver 220 from rotating around the rotation axis 48 includes providing a rotation restraint, and disposing the rotation restraint 226 proximate the inboard nonrotating electromagnetic coil driver 220 wherein the rotation restraint 226 physically grounds the inboard nonrotating electromagnetic coil driver 220 to a nonrotating machine member 50. Preferably the rotation restraint 226 includes at least one electrical conductor, and the method includes transmitting electricity through the rotation restraint 226 to the inboard nonrotating electromagnetic coil driver 220. Preferably the rotation restraint 226 is comprised of a torque arm 228 with the torque arm 228 including a printed circuit board 229 with the electrical conductors providing an electrical circuit to the nonrotating EM coil driver 220 for transmitting electricity. Preferably the aircraft propeller system comprises a propeller and an engine/gearbox with the rotating machine propeller shaft member coupling the propeller and the engine/gearbox.

Preferably the first counterweight rotating balancing rotor 111 is rotationally supported by a first rotor outboard rotating bearing support assembly 116 distal from the rotation axis 48, and the second counterweight rotating balancing rotor 111' is rotationally supported by a second rotor outboard rotating bearing support assembly 116 distal from the rotation axis 48 with the first and second counterweight rotating balancing rotors 111, 111' contained in a rotating outer casing 230, the rotating outer casing 230 housing the rotating balancing rotors 111, 111', with the outer casing 230 mechanically grounded to the rotating machine propeller shaft member 47 with the first rotor outboard rotating bearing support assembly 116 between the first counterweight rotating balancing rotor 111 and an outboard circumference of the outer casing 230, and with the second rotor outboard rotating bearing support assembly 116 between the second counterweight rotating balancing rotor 111' and the outboard circumference of the outer casing 230. FIG. 6 illustrates the outboard rotating bearing support assemblies 116 and the grounded rotating casing 230. Preferably the rotating outer casing 230 including a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate and the rotating center pole plate. Preferably the rotating outer casing 230 further includes a second rotating outer pole plate, the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231. Preferably the methods include maintaining a liquid lubricant sealed inside the rotating outer casing 230. Preferably the liquid lubricant fills the rotating outer casing 230. Preferably the liquid lubricant fills air void spaces inside the casing 230 and bathes the rotors and the outboard rotating bearing support assemblies. Preferably the sealed in liquid lubricant comprises a liquid oil, preferably a liquid oil having a viscosity in the range from 5 to 20 cst, preferably a non-grease liquid lubricant oil. Preferably the rotating outer casing 230 is comprised of a plurality of sealed welded outer casing members 240. FIG. 4 illustrates a casing weldment assembly with weld points 241 identified by triangles with the welds 241 welding together the outer casing members 240 to provide the sealed casing 230. Preferably the welded outer casing members 240 of the balancer casing 230 are united together with a plurality of welds 241, preferably from directed energy welding, preferably from energized beam welding, preferably electron beam welding, preferably vacuum electron beam welding. Preferably the plurality of outer casing members 240 have machine groove mating interface weld points, with the welding sealing the casing 230 with welds 241 proximate the mating interfaces, with the welded mating interface weld points sealing the casing 230 and containing the liquid lubricant. FIG. 4D illustrates a preferred welded rotating outer casing 230 and method of making a balancer and the rotating outer casing 230 with the outer casing members 240 including at least one decoupling void 242 in the outer casing member 240 proximate the welds 241. Preferably a decoupling void 242 is provided in outer perimeter ring outer casing member 240 proximate the welds 241 and the outer perimeter of the casing 230, with the decoupling void 242 preferably comprised of a groove running proximate the perimeter, with the decoupling void 242 inhibiting stress and strain distortion of the welded rotating outer casing 230 Preferably with the outer casing 230 members including the magnetic metal pole plates, including the center pole plate 231 and the two side pole plates 232, 232' with the pole plate patterns for a rotor matching up, with the center pole plate 231 magnetic material metal relief cut thinned metal depression patterns 233, 233' staggered.

The method preferably includes monitoring a plurality of rotating balancing rotor positions relative to the inboard nonrotating electromagnetic coil driver 220 to provide a monitored health performance failure detection characteristic of the aircraft propeller system 3. Preferably the methods include performing an aircraft maintenance repair procedure in relationship to the monitored health performance failure detection characteristic of the aircraft propeller system 3. Preferably the methods include monitoring a plurality of balancer sensor outputs to provide a monitored aircraft performance health failure detection characteristic, with the balancer sensor outputs preferably including sensor outputs selected from the sensor group including position, temperature, and vibration sensors.

In an embodiment the invention includes an aircraft propelling system 3. The aircraft system including a rotating machine member 47 which rotates around a rotation axis 48, a first counterweight rotating balancing rotor 111, the first counterweight heavy spot mass concentration balancing rotor 111 including a first plurality of holding stepping inboard magnets 112, preferably the inboard magnets 112 are noncircular magnets, preferably longitudinally extending magnets, preferably longitudinally extending normal to the rotation axis 48, preferably the longitudinally extending magnets extend and are elongated and aligned with radii extending out from the rotation axis 48, and a first outboard heavy spot mass concentration. Preferably the rotor is movably disposed upon the machine and contains at least one magnet for electromagnetically actuated rotational movement around the rotation axis 48 of the rotating machine member for which the balancer is mounted. Preferably the outboard heavy spot mass concentration is distal from the rotation axis 48 and the holding stepping inboard magnets 112 are proximate the rotation axis 48. The system preferably includes a second counterweight rotating balancing rotor 111', the second counterweight heavy spot mass concentration balancing rotor 111' including a second plurality of holding stepping inboard magnets 112 and a second outboard heavy spot mass concentration. Preferably the second rotor 111' is movably disposed upon the machine and contains at least one magnet 112 for electromagnetically actuated rotational movement around the rotation axis 48 of the rotating machine member 47 for which the balancer 110 is mounted, preferably the outboard heavy spot mass concentration are distal from the rotation axis 48 and the holding stepping inboard magnets 112 are proximate the rotation axis 48. The system preferably includes an inboard nonrotating electromagnetic coil driver 220, the inboard electromagnetic coil driver 220 including a first inboard electromagnetic coil proximate the rotation axis 48, and a second inboard electromagnetic coil proximate the rotation axis 48, the inboard nonrotating electromagnetic coil driver 220 and the first counterweight balancing rotor 111 and the second counterweight balancing rotor 111' centered around the rotating machine member 47 with the first inboard electromagnetic coil 221 proximate the first inboard magnets 112 of the first counterweight balancing rotor 111, the inboard nonrotating electromagnetic coil driver 220 proximate the rotation axis 48 and the first counterweight balancing rotor 111 outboard of the inboard nonrotating electromagnetic coil driver 220 and distal from the rotation axis 48. The first inboard electromagnetic coil 221 generating a electromagnetic field to electromagnetically step the first inboard magnets 112 of the at least first counterweight balancing rotor 111 to electromagnetically actuate rotational movement of the first counterweight heavy spot mass concentration balancing rotor around the rotation axis 48 and around the rotating machine member 47 and relative to the inboard nonrotating electromagnetic coil driver 220 to a first rotor held balancing position. The second inboard electromagnetic coil 221' is proximate the second counterweight balancing rotor 111', with the second inboard electromagnetic coil 221' proximate the second inboard magnets 112 of the second counterweight balancing rotor 111', wherein the second inboard electromagnetic coil 221' generates an electromagnetic field to electromagnetically step the second inboard magnets 112 of the second counterweight balancing rotor 111' to electromagnetically actuate rotational movement of the second counterweight heavy spot mass concentration balancing rotor 111' around the rotation axis 48 and relative to the inboard nonrotating electromagnetic coil driver 220 to a second rotor held position. Preferably the inboard electromagnetic coil driver 220 includes a plurality of inboard bearing members 224 rotationally supporting the inboard nonrotating electromagnetic coil driver 220 upon the rotating machine member 47, preferably with the coil support bearing members supporting the nonrotating coil driver 220 around the rotating machine member. Preferably the system includes a rotation restraint 226, the rotation restraint 226 disposed proximate the inboard nonrotating electromagnetic coil driver 220 wherein the rotation restraint 226 physically grounds the inboard nonrotating electromagnetic coil driver 220 to a nonrotating machine member 50. Preferably the system rotation restraint 226 includes an electrical circuit, preferably a printed circuit board 229, transmitting electricity through the rotation restraint. Preferably the system includes the first counterweight rotating balancing rotor 111 rotationally supported by a first rotor outboard rotating bearing support assembly 116 distal from the rotation axis 48, and the second counterweight rotating balancing rotor 111' is rotationally supported by a second rotor outboard rotating bearing support assembly 116 distal from the rotation axis 48 with the first and second counterweight rotating balancing rotors contained in a rotating outer casing 230, the rotating outer casing 230 housing the rotating balancing rotors 111, 111', with the outer casing 230 mechanically grounded to the rotating machine member 47 with the first rotor outboard rotating bearing support assembly 116 between the first counterweight rotating balancing rotor 111 and an outboard circumference of the outer casing 230, and with the second rotor outboard rotating bearing support assembly 116 between the second counterweight rotating balancing rotor 111' and the outboard circumference of the outer casing 230. Preferably the balancer system counterweight rotating balancing rotors 111, 111' have rotor outboard rotating bearing support assemblies 116 with thin section bearings with rollers and proximate the outer perimeter of casing 230, preferably with oriented arc integral machined bearing support flange 117 oriented relative to the heavy spot mass concentration 113 and the mass concentrations 114. Preferably the oriented arc integral machined bearing support flange 117 has an arc less than 180 degrees, preferably less than 165 degrees, preferably in the range from about 150 to 120 degrees, and preferably about 146 degrees. Preferably the arc is centered about the heavy spot mass concentration, and preferably opposes the mass voids 115 side of the rotors 111, 111'. Preferably during making and assembly of the balancer and rotors 111, 111' the rotor oriented arc integral machined bearing support flange 117 is provided as an integral feature of the rotor structure, preferably during the forming process of the rotor structure, preferably during machining of the rotor structure, and then during bearing 116 insertion, the bearing ring assembly with the rollers and inner and outer races are snap fitted around and past the rotor oriented arc integral machined bearing support flange 117, which is then followed by placement and fastening of nonintegral fastener bearing flange 118 around the remaining majority of the perimeter of the rotor. The oriented arc integral machined bearing support flange 117 and fastener bearing flange 118 capture the bearing assembly 116 axially. Preferably the rotating outer casing 230 including a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231. Preferably the rotating outer casing 230 further includes a second rotating outer pole plate 232', the second rotating outer pole plate 232' disposed relative to the rotating center pole plate 231 wherein the second counterweight rotating balancing rotor second plurality of holding stepping inboard magnets 112 noncontactingly received between the second rotating outer pole plate 232' and the rotating center pole plate 231. Preferably the system includes a liquid lubricant sealed inside the rotating outer casing 230. Preferably the liquid lubricant fills the rotating outer casing 230 and fills air void spaces inside the casing 230 and bathes the rotors and the outboard rotating bearing support assemblies. Preferably the sealed in liquid lubricant comprises a liquid oil, preferably having a viscosity in the range from 5 to 20 cst, preferably a non-grease liquid lubricant. Preferably the rotating outer casing 230 is comprised of a plurality of sealed welded outer casing members 240. Preferably welding outer casing members together with a plurality of welds 241 includes, preferably energized beam welding, preferably electron beam welding, preferably vacuum electron beam welding are utilized to bond the casing members 240 together, preferably with the plurality of outer casing members 240 having machine groove mating interface weld points, with the welding 241 sealing the casing 230 proximate the mating interfaces. Preferably the welded united outer casing members 240 include the magnetic metal pole plates.

In an embodiment the invention includes an electromagnetically actuated machine balancer 110 for mounting on a rotating machine member 47 and balancing the rotating machine member. The electromagnetically actuated balancer 110 preferably comprises at least a first counterweight heavy spot mass concentration rotating balancing rotor 111, the first counterweight heavy spot mass concentration balancing rotor 111 including a first plurality of holding stepping inboard magnets 112 and a first outboard heavy spot mass concentration. The rotor 111 is movably disposed upon the machine 47 and contains a pattern of magnets 112 for electromagnetically actuated rotational movement around the rotation axis 48 of the rotating machine member 47 for which the balancer 110 is mounted, preferably with outboard heavy spot mass concentration distal from the rotation axis 48 and the holding stepping inboard magnets 112 proximate the rotation axis 48. The electromagnetically actuated balancer 110 preferably comprises an inboard nonrotating electromagnetic coil driver 220, the inboard electromagnetic coil driver 220 including at least a first inboard electromagnetic coil 221 proximate the rotation axis 48, the first inboard electromagnetic coil 221 proximate the first inboard magnets 112 of the counterweight balancing rotor 111, wherein the first inboard electromagnetic coil 221 generates an electromagnetic field to electromagnetically step the first inboard magnets 112 of the at least first counterweight balancing rotor 111 to electromagnetically actuate rotational movement of the first counterweight heavy spot mass concentration balancing rotor 111 around the rotation axis 48 and relative to the inboard nonrotating electromagnetic coil driver 220. Preferably with the inboard electromagnetic coil driver 220 including a plurality of inboard bearing members 224, the bearing members between the inboard nonrotating electromagnetic coil driver 220 and the rotating machine member 47, preferably with the coil support bearing members 224 supporting the nonrotating coil driver 220 around the rotating machine member 47. Preferably the bearing members 224 include a plurality of inboard roller bearings between the first inboard electromagnetic coil 221 and the rotation axis 48. Preferably the electromagnetically actuated machine balancer 110 includes a rotation restraint 226, the rotation restraint 226 physically grounding the inboard nonrotating electromagnetic coil driver 220 to a nonrotating machine member 50, preferably a restraining yoke, preferably a movable rotation restraint antitorque tie rod 226 providing a level of decoupled motion between inboard nonrotating electromagnetic coil driver 220 and the nonrotating machine member 50, with a mechanical physical play yoke or motion accommodating mount, preferably with the antitorque tie rod restraint 226 providing electrical power and signals to the balancer and also carrying an axial mechanical load, preferably through the printed circuit board 229. Preferably the restraint includes snapon snapoff mating electrical disconnectable connectors 225, 225' for connecting and disconnecting the electrical circuits of antitorque tie rod restraining circuit board 229 to nonrotating electrical wiring conduits mechanically grounded with nonrotating machine member 50. Preferably the restraint is a torque arm 228 with elastomeric mounting members 227, preferably with the torque arm 228 physically and electrically connecting to the coil driver 220. Preferably the balancer 110 includes a second counterweight heavy spot mass concentration rotating balancing rotor 111', the second counterweight heavy spot mass concentration balancing rotor 111' including a second plurality of holding stepping inboard magnets 112 and a second outboard heavy spot mass concentration, preferably with the rotor 111' movably disposed upon the machine and containing at least one magnet 112 for electromagnetically actuated rotational movement around the rotation axis 48 of the rotating machine member 47 for which the balancer is mounted, preferably with the outboard heavy spot mass concentration distal from the rotation axis 48 and the holding stepping inboard magnets 112 proximate the rotation axis 48. Preferably the inboard electromagnetic coil driver 220 including a second inboard electromagnetic coil 221' proximate the rotation axis 48, the second inboard electromagnetic coil 221' proximate the second inboard magnets 112 of the second counterweight balancing rotor 111', wherein the second inboard electromagnetic coil 221' generates an electromagnetic field to electromagnetically step the second inboard magnets 112 of the second counterweight balancing rotor 111' to electromagnetically actuate rotational movement of the second counterweight heavy spot mass concentration balancing rotor 111' around the rotation axis 48 and relative to the inboard nonrotating electromagnetic coil driver 220. Preferably the inboard magnets 112 are noncircular magnets 112, preferably longitudinally extending magnets 112, preferably longitudinally extending normal to the rotation axis 48, preferably the longitudinally extending magnets 112 extend and are elongated and aligned with radii extending out from the rotation axis 48. Preferably the balancer 110 includes a rotating center pole plate 231, the rotating center pole plate 231 disposed between the first counterweight heavy spot mass concentration rotating balancing rotor 111 and the second counterweight heavy spot mass concentration rotating balancing rotor 111', the rotating center pole plate 231 physically grounded to the rotating machine member 47 wherein the rotating center pole plate 231 rotates along with the rotating machine member 47 around the rotation axis 48 and provides a grounded rotating holding stepping reference point for the first counterweight heavy spot mass concentration rotating balancing rotor 111 and the second counterweight heavy spot mass concentration rotating balancing rotor 111' to rotate relative to around the rotation axis 48 preferably with an actuation push off point when the coil magnet fields are generated, and the rotors 111, 111' are stepped relative to the pole plates 231, 232, 232' and then held at such position until the next activating balance need, preferably the rotors 111, 111' are intermittingly rotated relative to the rotating machine member 47 and rested and held at a balance position around the rotating machine 47 with the balance force vectors of the held/resting rotor resulting in a balancing vector cancelling an imbalance force vector of the rotating machine 47, preferably with the rotors 111, 111' not continually electromagnetically actuated and driven to rotate continuously relative to the rotating pole plates 231, 232, 232' and its grounding rotating machine member 47 and the rotating member, preferably inhibiting generating of a continuous circular rotating force vector. Preferably the balancer includes a first rotating outer pole plate 232 with a pattern 234 of poles, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, with the rotating center pole plate 231 preferably having a first pole face side, the first pole face side facing the first rotating outer pole plate 232 with a pattern 233 of poles, preferably with the pattern 233 of poles preferably provided by a thinning of magnetic pole plate material, preferably with a magnetic metal pole plate with a pattern 233 of thinned metal depressions. Preferably the balancer 110 includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231, preferably the rotating center pole plate 231 preferably having a second pole face side, the second pole face side facing the second rotating outer pole plate 232' with a pattern 233' of poles, the second pole face side pattern 233' clockingly staggered relative to the first face side pattern 233, preferably with the pattern of poles preferably provided by a thinning of magnetic pole plate material, preferably a magnetic metal pole plate with pattern of thinned metal depressions. Preferably the rotating center pole plate 231 preferably having consistent offset staggered poles, one side pole pattern of depression thinned metal staggered relative to the opposite face side. Preferably the pole plate patterns 233, 233' are formed from thin metal depressions, preferably not through cuts of metal material, preferably not through holes/notches all the way through the magnetic material. Preferably the first counterweight heavy spot mass concentration rotating balancing rotor 111 is rotationally supported by a first rotor outboard rotating bearing support assembly 116. Preferably the rotor 111 is contained in a rotating outer casing 230, the rotating outer casing 230 housing the rotor 111, with the outer casing 230 physically mechanically grounded mounted to the rotating machine member. Preferably the rotating outer casing 230 includes a plurality of rotating inboard pole plates 231, 232, 232' for noncontactingly and magnetically receiving the rotor magnets 112.

Preferably the first counterweight heavy spot mass concentration rotating balancing rotor 111 is rotationally supported by a first rotor outboard rotating bearing support assembly 116 distal from the rotation axis 48, and the second counterweight heavy spot mass concentration rotating balancing rotor 111' is rotationally supported by a second rotor outboard rotating bearing support assembly 116 distal from the rotation axis 48, preferably with the first and second counterweight rotating balancing rotors 111, 111' contained in a rotating outer casing 230, the rotating outer casing 230 housing the rotating balancing rotors, with the outer casing 230 physically mechanically grounded mounted to the rotating machine member 47. Preferably the rotating outer casing 230 includes a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, preferably the rotating outer casing 230 further includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231.

Preferably the first counterweight heavy spot mass concentration rotating balancing rotor 111 has an outside diameter FCWROD and the first inboard electromagnetic coil 221 has an outside diameter FEMCOD with FEMCOD<FCWROD. Preferably the first counterweight heavy spot mass concentration rotating balancing rotor 111 has an inside diameter FCWRID with FCWRID>FEMCOD. Preferably the second counterweight heavy spot mass concentration rotating balancing rotor 111' has an outside diameter SCWROD and an inside diameter SCWRID and the second inboard electromagnetic coil 221' has an outside diameter SEMCOD with SEMCOD<SCWROD, and SEMCOD<SCWRID.

Preferably the first counterweight rotating balancing rotor 111 is rotationally supported by a first rotor outboard rotating bearing support assembly 116 distal from the rotation axis 48, and the second counterweight rotating balancing rotor 111' is rotationally supported by a second rotor outboard rotating bearing support assembly 116 distal from the rotation axis 48 with the first and second counterweight rotating balancing rotors 111, 111' contained in a rotating outer casing 230, the rotating outer casing 230 housing the rotating balancing rotors 111, 111', with the outer casing 230 mechanically grounded to the rotating machine member 47 with the first rotor outboard rotating bearing support assembly 116 between the first counterweight rotating balancing rotor 111 and an outboard circumference of the outer casing 230, and with the second rotor outboard rotating bearing support assembly 116 between the second counterweight rotating balancing rotor 111' and the outboard circumference of the outer casing 230 (preferably the rotating outer casing 230 including a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate, preferably the rotating outer casing 230 further includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231).

Preferably a liquid lubricant is sealed inside the rotating outer casing 230. Preferably the liquid lubricant fills the rotating outer casing 230 and fills air void spaces inside the casing 230 and bathes the rotors and the outboard rotating bearing support assemblies. Preferably the sealed in liquid lubricant comprises a liquid oil, preferably having a viscosity in the range from 5 to 20 cst, preferably a non-grease liquid lubricant.

In an embodiment the invention includes a method of making an electromagnetically actuated machine balancer 110 for mounting on a rotating machine member 47 and balancing the rotating machine member. The method includes providing a first counterweight heavy spot mass concentration rotating balancing rotor 111, the first counterweight heavy spot mass concentration balancing rotor 111 including a first plurality of holding stepping inboard magnets 112, preferably the inboard magnets 112 are noncircular magnets 112, preferably longitudinally extending magnets 112, preferably longitudinally extending normal to the rotation axis 48, preferably the longitudinally extending magnets 112 extend and are elongated and aligned with radii extending out from the rotation axis 48 and first outboard heavy spot mass concentration outboard heavy spot mass concentration distal from the rotation axis 48 and the holding stepping inboard magnets 112 proximate the rotation axis 48. The method includes providing an inboard nonrotating electromagnetic coil driver 220, the inboard electromagnetic coil driver 220 including at least a first inboard electromagnetic coil 221 proximate the rotation axis 48. The method includes disposing the first inboard electromagnetic coil 221 proximate the first inboard magnets 112 of the counterweight balancing rotor 111, wherein the first inboard electromagnetic coil 221 generates a magnet field to electromagnetically step the first inboard magnets 112 of the at least first counterweight balancing rotor 111 to electromagnetically actuate rotational movement of the first counterweight heavy spot mass concentration balancing rotor 111 around the rotation axis 48 relative to the inboard nonrotating electromagnetic coil driver 220.

Preferably the inboard electromagnetic coil driver 220 including a plurality of inboard bearing members 224, the bearing members for rotationally supporting the inboard nonrotating electromagnetic coil driver 220 around a rotating machine member 47, the coil support bearing members 224 supporting the nonrotating coil driver 220 around the rotating machine member.

Preferably the inboard bearing members 224 include a plurality of inboard roller bearings between the first inboard electromagnetic coil and a rotation axis 48 of the balancer.

Preferably the method including providing a rotation restraint 226, and disposing the rotation restraint 226 proximate the inboard nonrotating electromagnetic coil driver 220 wherein the rotation restraint 226 physically grounds the inboard nonrotating electromagnetic coil driver 220 to a nonrotating machine member 50. Preferably the rotation restraint 226 is an anti-torque arm 228 restraining yoke, preferably a movable rotation restraint 226 providing a level of decoupled motion between inboard nonrotating electromagnetic coil driver 220 and the nonrotating machine member, mechanical physical play yoke or motion accommodating mount, preferably a torque arm 228 with elastomeric mounting members 227, preferably with the torque arm 228 physically and electrically connecting to the coil driver 220.

Preferably the method includes providing a second counterweight heavy spot mass concentration rotating balancing rotor 111', the second counterweight heavy spot mass concentration balancing rotor 111' including a second plurality of holding stepping inboard magnets 112 and a second outboard heavy spot mass concentration. Preferably the rotor 111' is movably disposed upon the machine 47 and containing at least one magnet 112 for electromagnetically actuated rotational movement around the rotation axis 48 of the rotating machine member 47 for which the balancer is mounted, with the outboard heavy spot mass concentration distal from the rotation axis 48 and the holding stepping inboard magnets 112 proximate the rotation axis 48.

Preferably the method including providing a second inboard electromagnetic coil 221' proximate the rotation axis 48, disposing the second inboard electromagnetic coil 221' proximate the second inboard magnets 112 of the second counterweight balancing rotor 111', wherein the second inboard electromagnetic coil 221' generates a magnet field 222 to electromagnetically step the second inboard magnets 112 of the second counterweight balancing rotor to electromagnetically actuate rotational movement of the second counterweight heavy spot mass concentration balancing rotor around the rotation axis 48 and relative to the inboard nonrotating electromagnetic coil driver 220.

Preferably the method including providing a rotating center pole plate 231, disposing the rotating center pole plate 231 between the first counterweight heavy spot mass concentration rotating balancing rotor 111 and the second counterweight heavy spot mass concentration rotating balancing rotor 111', the rotating center pole plate 231 physically groundable to a rotating machine member 47 wherein the rotating center pole plate 231 rotates along with the rotating machine member 47 around a rotation axis 48 to provide a grounded rotating holding stepping reference point for the first counterweight heavy spot mass concentration rotating balancing rotor 111 and the second counterweight heavy spot mass concentration rotating balancing rotor 111' to rotate relative to around the rotation axis 48, with actuation push off points when the coil magnet fields 222 are generated, with the rotors 111, 111' stepped relative to the pole plate 231 and then held at such position until the next activating balance need, preferably rotors 111, 111' are intermittingly rotated relative to the rotating machine member 47 and rested and held at a balance position around the rotating machine with the balance force vectors of the held/resting rotor resulting in a balancing vector cancelling an imbalance force vector of the rotating machine 47, preferably the rotors 111, 111' are not continually electromagnetically actuated and driven to rotate continuously relative to the rotating pole plate 231 and its grounding rotating machine member and the rotating member 47, preferably inhibiting generating of a continuous circular rotating force vector. Preferably the first rotating outer pole plate 232 with a pattern 234 of poles, with the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231. Preferably the rotating center pole plate 231 preferably has a first pole face side, the first pole face side facing the first rotating outer pole plate 232 with a pattern 233 of poles, with the pattern 233 of poles preferably provided by a thinning of magnetic pole plate material, preferably magnetic metal pole plate 231 with a pattern 233 of thinned metal depressions. Preferably the second rotating outer pole plate 232' is disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231, and the rotating center pole plate 231 preferably having a second pole face side, the second pole face side facing the second rotating outer pole plate 232' with a pattern 232' of poles, the second pole face side pattern 232' clockingly staggered relative to the first face side pattern 232, with the pattern of poles 232' preferably provided by a thinning of magnetic pole plate material, preferably magnetic metal pole plate 231 with pattern of thinned metal depression. Preferably the rotating center pole plate 231 preferably having consistent offset staggered poles, one side pole pattern 232 of depression thinned metal staggered relative to the opposite face side pattern 232', preferably the pole plate patterns 232, 232' formed from thin metal depressions, preferably not through cuts of metal material, preferably not through holes/notches all the way through the magnetic material.

The method preferably including providing a first rotor outboard rotating bearing support assembly 116 wherein the first counterweight heavy spot mass concentration rotating balancing rotor 111 is rotationally supported by the first rotor outboard rotating bearing support assembly 116. Preferably with the rotor 111 contained in a rotating outer casing 230, the rotating outer casing 230 housing the rotor 111, with the outer casing 230 physically mechanically grounded mounted to the rotating machine member 47, preferably the rotating outer casing 230 including a plurality of rotating inboard pole plates 231, 232, 232' for noncontactingly and magnetically receiving the rotor magnets 112.

The method preferably including providing a first rotor outboard rotating bearing support assembly 116 wherein the first counterweight heavy spot mass concentration rotating balancing rotor 111 is rotationally supported by the first rotor outboard rotating bearing support assembly 116 distal from the rotation axis 48, and providing a second rotor outboard rotating bearing support assembly 116 wherein the second counterweight heavy spot mass concentration rotating balancing rotor 111' is rotationally supported by the second rotor outboard rotating bearing support assembly 116 distal from the rotation axis 48. Preferably the first and second counterweight rotating balancing rotors 111, 111' are contained in a rotating outer casing 230, the rotating outer casing 230 housing the rotating balancing rotors 111, 111', with the outer casing 230 physically mechanically grounded mounted to the rotating machine member 47. Preferably the rotating outer casing 230 including a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, preferably the rotating outer casing 230 further includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231.

Preferably the first counterweight heavy spot mass concentration rotating balancing rotor 111 has an outside diameter FCWROD and the first inboard electromagnetic coil 221 has an outside diameter FEMCOD with FEMCOD<FCWROD.

Preferably the first counterweight heavy spot mass concentration rotating balancing rotor 111 has an inside diameter FCWRID with FCWRID>FEMCOD.

Preferably the second counterweight heavy spot mass concentration rotating balancing rotor 111' has an outside diameter SCWROD and an inside diameter SCWRID and the second inboard electromagnetic coil 221' has an outside diameter SEMCOD with SEMCOD<SCWROD, and SEMCOD<SCWRID.

Preferably the first counterweight rotating balancing rotor 111 is rotationally supported by a first rotor outboard rotating bearing support assembly 116 distal from the rotation axis 48, and the second counterweight rotating balancing rotor 111' is rotationally supported by a second rotor outboard rotating bearing support assembly 116 distal from the rotation axis 48 with the first and second counterweight rotating balancing rotors 111, 111' contained in a rotating outer casing 230, the rotating outer casing 230 housing the rotating balancing rotors 111, 111', with the outer casing 230 mechanically grounded to the rotating machine member 47 with the first rotor outboard rotating bearing support assembly 116 between the first counterweight rotating balancing rotor 111 and an outboard circumference of the outer casing 230, and with the second rotor outboard rotating bearing support assembly 116 between the second counterweight rotating balancing rotor 111' and the outboard circumference of the outer casing 230. Preferably the rotating outer casing 230 including a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, preferably the rotating outer casing 230 further includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231.

Preferably a liquid lubricant is sealed inside the rotating outer casing 230. Preferably the liquid lubricant filling the rotating outer casing 230 and fluidly communicating air void spaces inside the casing 230 and bathes the rotors and the outboard rotating bearing support assemblies 116. Preferably the sealed in liquid lubricant comprises a liquid oil, preferably having a viscosity in the range from 5 to 20 cst, preferably a non-grease liquid lubricant.

Preferably the rotating outer casing 230 is comprised of a plurality of outer casing members 240, with the method including uniting the outer casing members 240, preferably by welding the outer casing members 240 together with a plurality of welds 241, preferably with energized beam welding, preferably with electron beam welding, preferably with vacuum electron beam welding, preferably with the plurality of outer casing members 240 having machine groove mating interface weld points, with the weldings 241 sealing the casing 230 proximate the mating interfaces of the outer casing members 240, preferably with the outer casing members 240 including the magnetic metal pole plates.

In an embodiment the invention includes a method of electromagnetically balancing a rotating machine member 47 which rotates about a rotation axis 48. The method preferably includes providing a first counterweight heavy spot mass concentration rotating balancing rotor 111, the first counterweight heavy spot mass concentration balancing rotor 111 including a first plurality of holding stepping inboard magnets 112, preferably the inboard magnets 112 are noncircular magnets 112, preferably longitudinally extending magnets 112, preferably longitudinally extending normal to the rotation axis 48, preferably the longitudinally extending magnets 112 extend and are elongated and aligned with radii extending out from the rotation axis 48 and a first outboard heavy spot mass concentration. Preferably the rotor 111 movably disposed upon the machine 47 and containing at least one magnet 112 for electromagnetically actuated rotational movement around the rotation axis 48 of the rotating machine member 47 for which the balancer 110 is mounted, the outboard heavy spot mass concentration distal from the rotation axis 48 and the holding stepping inboard magnets 112 proximate the rotation axis 48. The method preferably includes providing an inboard nonrotating electromagnetic coil driver 220, the inboard electromagnetic coil driver 220 including at least a first inboard electromagnetic coil 221 proximate the rotation axis 48. The method preferably includes disposing the inboard nonrotating electromagnetic coil driver 220 and the first counterweight balancing rotor 111 around the rotating machine member 47 with the first inboard electromagnetic coil 221 proximate the first inboard magnets 112 of the first counterweight balancing rotor, the inboard nonrotating electromagnetic coil driver 220 proximate the rotation axis 48 and the first counterweight balancing rotor 111 outboard of the inboard nonrotating electromagnetic coil driver 220 distal from axis 48 wherein the first inboard electromagnetic coil 221 generates a electromagnetic field 222 to electromagnetically step the first inboard magnets 112 of the at least first counterweight balancing rotor 111 to electromagnetically actuate rotational movement of the first counterweight heavy spot mass concentration balancing rotor 111 around the rotation axis 48 around the rotating machine member 47 and relative to the inboard nonrotating electromagnetic coil driver 220.

Preferably the inboard electromagnetic coil driver 220 including a plurality of inboard bearing members 224, the inboard bearing members 224 rotationally supporting the inboard nonrotating electromagnetic coil driver 220 upon the rotating machine member 47, the coil support bearing members 224 supporting the nonrotating coil driver 220 around the rotating machine member 47.

Preferably the inboard bearing members 224 include a plurality of inboard roller bearings between the first inboard electromagnetic coil 221 and the rotation axis 48.

Preferably the method including providing a rotation restraint 226, and disposing the rotation restraint 226 proximate the inboard nonrotating electromagnetic coil driver 220 wherein the rotation restraint 226 physically grounds the inboard nonrotating electromagnetic coil driver 220 to a nonrotating machine member 50, preferably an anti-torque arm 228 restraining yoke, preferably a movable rotation restraint 226 providing a level of decoupled motion between inboard nonrotating electromagnetic coil driver 220 and the nonrotating machine member, mechanical physical play yoke or motion accommodating mount, preferably a torque arm 228 with elastomeric mounting members, preferably with the torque arm 228 physically and electrically connecting to the coil driver 220.

Preferably the method including providing a second counterweight heavy spot mass concentration rotating balancing rotor 111', the second counterweight heavy spot mass concentration balancing rotor 111' including a second plurality of holding stepping inboard magnets 112 and a second outboard heavy spot mass concentration, the rotor movably disposed upon the machine 47 and containing at least one magnet 112 for electromagnetically actuated rotational movement around the rotation axis 48 of the rotating machine member 47 for which the balancer is mounted, the outboard heavy spot mass concentration distal from the rotation axis 48 and the holding stepping inboard magnets 112 proximate the rotation axis 48.

Preferably the method including providing a second inboard electromagnetic coil 221' proximate the rotation axis 48, disposing the second inboard electromagnetic coil 221' and second counterweight balancing rotor 111' proximate the first inboard electromagnetic coil 221 and the first counterweight balancing rotor 111, with the second inboard electromagnetic coil 111' proximate the second inboard magnets 112 of the second counterweight balancing rotor 111', wherein the second inboard electromagnetic coil 221' generates an electromagnetic field 222 to electromagnetically step the second inboard magnets 112 of the second counterweight balancing rotor 111' to electromagnetically actuate rotational movement of the second counterweight heavy spot mass concentration balancing rotor 111' around the rotation axis 48 and relative to the inboard nonrotating electromagnetic coil driver 220.

Preferably the method including providing a rotating center pole plate 231, and disposing the rotating center pole plate 231 between the first counterweight heavy spot mass concentration rotating balancing rotor 111 and the second counterweight heavy spot mass concentration rotating balancing rotor 111', the rotating center pole plate 231 physically grounded to the rotating machine member 47 wherein the rotating center pole plate 231 rotates along with the rotating machine member 47 around the rotation axis 48 and provides a grounded rotating holding stepping reference point for the first counterweight heavy spot mass concentration rotating balancing rotor 111 and the second counterweight heavy spot mass concentration rotating balancing rotor 111' to rotate relative to around the rotation axis 48 with an actuation push off point when the EM coil magnet fields 222 are generated. Preferably the rotors 111, 111' are stepped relative to the pole plates and then held at such position until the next activating balance need, preferably the rotors 111, 111' are intermittingly rotated relative to the rotating machine member and rested and held at a balance position around the rotating machine with the balance force vectors of the held/resting rotor resulting in a balancing vector cancelling an imbalance force vector of the rotating machine, preferably with the rotors are not continually electromagnetically actuated and continually driven to rotate continuously relative to the rotating pole plate and its grounding rotating machine member and the rotating member, preferably inhibiting generating of a continuous circular rotating force vector. The casing 230 preferably includes a first rotating outer pole plate 232 with a pattern 234 of poles, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, preferably with the rotating center pole plate 231 preferably having a first pole face side, the first pole face side facing the first rotating outer pole plate 232 with a pattern 233 of poles, the pattern 233 of poles preferably provided by a thinning of magnetic pole plate material, preferably a magnetic metal pole plate with a pattern 233 of thinned metal depressions. The casing 230 preferably includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231, the rotating center pole plate 231 preferably having a second pole face side, the second pole face side facing the second rotating outer pole plate 232' with a pattern 233' of poles, the second pole face side pattern 233' clockingly staggered relative to the first face side pattern 233, preferably a pattern of poles preferably provided by a thinning of magnetic pole plate material, preferably a magnetic metal pole plate with pattern of thinned metal depressions 233, 233'. Preferably the rotating center pole plate 231 preferably having consistent offset staggered poles 233, 233', one side pole pattern 233 of depression thinned metal staggered relative to the opposite face side 233', preferably pole plate patterns formed from thin metal depressions, preferably not through cuts of metal material (preferably not through holes/notches all the way through the magnetic material).

Preferably the method including providing at least a first rotor outboard rotating bearing support assembly 116 wherein the first counterweight heavy spot mass concentration rotating balancing rotor 111 is rotationally supported by the first rotor outboard rotating bearing support assembly 116. Preferably the rotors 111, 111' are contained in a rotating outer casing 230, the rotating outer casing 230 housing the rotors 111, 111', with the outer casing 230 physically mechanically grounded mounted to the rotating shaft machine member rotating 47, preferably with the rotating outer casing 230 including a plurality of rotating inboard pole plates 231, 232, 232' proximate the rotation axis 48 for non-contactingly and magnetically receiving the rotor magnets 112, with the pole plates magnetic pattern receiving the magnetic pattern of the rotor's magnets 112, and channeling the electromagnetic field 222 of the proximate electromagnetic coil of the driver 220 to provide stepping actuation of the rotor and position holding of the rotor relative to the outer casing 230 physically mechanically grounded mounted rotating inboard pole plates.

Preferably the method including providing a first rotor outboard rotating bearing support assembly 116 wherein the first counterweight heavy spot mass concentration rotating balancing rotor 111 is rotationally supported by the first rotor outboard rotating bearing support assembly distal 116 from the rotation axis 48, and providing a second rotor outboard rotating bearing support assembly 116 wherein the second counterweight heavy spot mass concentration rotating balancing rotor 111' is rotationally supported by the second rotor outboard rotating bearing support assembly 116 distal from the rotation axis 48. Preferably the first and second counterweight rotating balancing rotors 111, 111' are contained in a rotating outer casing 230, the rotating outer casing 230 housing the rotating balancing rotors, with the outer casing 230 physically mechanically grounded mounted to the rotating machine member. Preferably the rotating outer casing 230 includes a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, preferably the rotating outer casing 230 further includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231.

Preferably the first counterweight heavy spot mass concentration rotating balancing rotor 111 has an outside diameter FCWROD and the first inboard electromagnetic coil 221 has an outside diameter FEMCOD with FEMCOD<FCWROD.

Preferably the first counterweight heavy spot mass concentration rotating balancing rotor 111 has an inside diameter FCWRID with FCWRID>FEMCOD.

Preferably the second counterweight heavy spot mass concentration rotating balancing rotor 111' has an outside diameter SCWROD and an inside diameter SCWRID and the second inboard electromagnetic coil 221' has an outside diameter SEMCOD with SEMCOD<SCWROD, and SEMCOD<SCWRID.

Preferably the first counterweight rotating balancing rotor 111 is rotationally supported by a first rotor outboard rotating bearing support assembly 116 distal from the rotation axis 48, and the second counterweight rotating balancing rotor 111' is rotationally supported by a second rotor outboard rotating bearing support assembly 116 distal from the rotation axis 48 with the first and second counterweight rotating balancing rotors 111, 111' contained in a rotating outer casing 230, the rotating outer casing 230 housing the rotating balancing rotors 111, 111', with the outer casing 230 mechanically grounded to the rotating machine member with the first rotor outboard rotating bearing support assembly 116 between the first counterweight rotating balancing rotor 111 and an outboard circumference of the outer casing 230, and with the second rotor outboard rotating bearing support assembly 116 between the second counterweight rotating balancing rotor 111' and the outboard circumference of the outer casing 230. Preferably the rotating outer casing 230 including a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, preferably the rotating outer casing 230 further includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231.

Preferably a liquid lubricant is sealed inside the rotating outer casing 230. Preferably the liquid lubricant fills the rotating outer casing 230, preferably filling and displacing air void spaces inside the casing 230 and bathing the casing 230 interior volume and the rotors and the outboard rotating bearing support assemblies. Preferably the sealed in liquid lubricant comprises a liquid oil, preferably having a viscosity in the range from 5 to 20 cst, preferably a non-grease liquid lubricant.

Preferably the rotating outer casing 230 is comprised of a plurality of sealed welded outer casing members 240. Preferably the outer casing members 240 are welded together with a plurality of welds 241, preferably with energized beam welds, preferably electron beam welds, preferably vacuum electron beam welds, preferably with the plurality of outer casing members 240 having machine groove mating interface weld points, with the weldings 241 sealing the casing 230 proximate the machine groove mating interfaces of the casing members 240. Preferably the outer casing united welded members 240 including the magnetic metal pole plates.

Preferably the method includes overtime monitoring a plurality of first counterweight heavy spot mass concentration rotating balancing rotor 111 positions relative to the inboard nonrotating electromagnetic coil driver 220 to provide a health performance failure detection characteristic of the rotating machine member 47.

Preferably the method includes monitoring a plurality of first counterweight heavy spot mass concentration rotating balancing rotor 111 positions and second counterweight heavy spot mass concentration rotating balancing rotor 111' positions relative to the inboard nonrotating electromagnetic coil driver 220 to provide a monitored performance health failure detection characteristic of the rotating machine member 46, 44.

Preferably the method includes monitoring a plurality of balancer sensor outputs from balancer sensors such as sensors 46, 44 to provide a monitored performance health failure detection characteristic of the rotating machine member 47. Preferably the balancer sensor outputs are chosen from a sensor group including position sensors, temperature sensors, and vibration sensors.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. A method of balancing an aircraft propeller system comprising:
   providing an aircraft propeller system with a rotating machine propeller shaft member which rotates around a rotation axis;

providing a first counterweight balancing rotor, said first counterweight balancing rotor including a plurality of first inboard magnets and a first outboard mass concentration;

providing a second counterweight balancing rotor, said second counterweight balancing rotor including a plurality of second inboard magnets and a second outboard mass concentration;

providing an inboard electromagnetic coil driver, said inboard electromagnetic coil driver including a first inboard electromagnetic coil, and a second inboard electromagnetic coil;

rotationally supporting said inboard electromagnetic coil driver upon said rotating machine propeller shaft member, wherein said rotationally supporting includes a plurality of inboard bearing members, said inboard bearing members included within said inboard electromagnetic coil driver:

disposing said inboard electromagnetic coil driver and said first counterweight balancing rotor and said second counterweight balancing rotor around said rotating machine propeller shaft member with said first inboard electromagnetic coil proximate said first inboard magnets of said first counterweight balancing rotor, said inboard electromagnetic coil driver proximate said rotation axis and said first counterweight balancing rotor outboard of said inboard electromagnetic coil driver;

generating an electromagnetic field with said first inboard electromagnetic coil to electromagnetically step said first inboard magnets of said first counterweight balancing rotor to electromagnetically actuate rotational movement of said first counterweight balancing rotor around said rotating machine member and relative to said inboard electromagnetic coil driver;

positioning said second inboard electromagnetic coil proximate said second counterweight balancing rotor, with said second inboard electromagnetic coil proximate said second inboard magnets of said second counterweight balancing rotor; and generating an electromagnetic field with said second inboard electromagnetic coil to electromagnetically step said second inboard magnets of said second counterweight balancing rotor to electromagnetically actuate rotational movement of said second counterweight balancing rotor around said rotation axis and relative to said inboard electromagnetic coil driver.

2. The method of claim 1, further comprising the step of restraining said inboard electromagnetic coil driver from rotating around said rotation axis.

3. The method of claim 2, wherein the step of restraining said inboard electromagnetic coil driver from rotating around said rotation axis includes providing a rotation restraint, and disposing said rotation restraint proximate said inboard electromagnetic coil driver, wherein said rotation restraint physically grounds said inboard electromagnetic coil driver to a nonrotating machine member.

4. The method of claim 3, further comprising the step of transmitting electricity through said rotation restraint using at least one electrical conductor to said inboard electromagnetic coil driver, said at least one electrical conductor positioned within said rotation restraint.

5. The method of claim 1, wherein said aircraft propeller system includes a propeller and an engine/gearbox, wherein the method further comprises the step of coupling said propeller and said engine/gearbox with said rotating machine propeller shaft member.

6. The method of claim 1, further comprising the steps of:
rotationally supporting said first counterweight balancing rotor with a first rotor bearing support assembly;
rotationally supporting said second counterweight balancing rotor with a second rotor bearing support assembly containing said first and second counterweight balancing rotors positioned within a rotating outer casing, said rotating outer casing housing said first and second counterweight balancing rotors, wherein said rotating outer casing is mechanically grounded to said rotating machine propeller shaft member with said first rotor bearing support assembly positioned between said first counterweight balancing rotor and an outboard circumference of said rotating outer casing, and with said second rotor bearing support assembly positioned between said second counterweight balancing rotor and said outboard circumference of said rotating outer casing.

7. The method as claimed in claim 6, including maintaining a liquid lubricant sealed inside said rotating outer casing.

8. The method as claimed in claim 6, wherein said rotating outer casing is comprised of a plurality of sealed welded casing members.

9. The method as claimed in claim 1, including monitoring a plurality of balancing rotor positions relative to said inboard electromagnetic coil driver to provide a monitored health characteristic of said aircraft propeller system.

10. The method as claimed in claim 9, including performing an aircraft maintenance repair procedure in relationship to said monitored health characteristic of said aircraft propeller system.

11. The method as claimed in claim 1, including monitoring a plurality of balancer sensor outputs to provide a monitored aircraft performance health characteristic.

12. An aircraft system, said aircraft system including
a rotating machine member having a rotation axis about which said rotating machine member rotates around;
a first counterweight balancing rotor, said first counterweight balancing rotor including a plurality of first inboard magnets and a first outboard mass concentration;
a second counterweight balancing rotor, said second counterweight balancing rotor including a plurality of second inboard magnets and a second outboard mass concentration;
an inboard electromagnetic coil driver, said inboard electromagnetic coil driver including a first inboard electromagnetic coil and a second inboard electromagnetic coil, wherein said inboard electromagnetic coil driver, said first counterweight balancing rotor, and said second counterweight balancing rotor are centered around said rotating machine member with said first inboard electromagnetic coil proximate said first inboard magnets of said first counterweight balancing rotor, wherein said inboard electromagnetic coil driver includes a plurality of inboard bearing members configured to rotationally support said inboard electromagnetic coil driver upon said rotating machine member;
said inboard electromagnetic coil driver proximate said rotation axis and said first counterweight balancing rotor outboard of said inboard electromagnetic coil driver, wherein said first inboard electromagnetic coil is configured to generate an electromagnetic field capable of electromagnetically stepping said first inboard magnets of said first counterweight balancing rotor to electromagnetically actuate rotational movement of said first counterweight balancing rotor around said rotating machine member, wherein the rotational movement of said first counterweight balancing rotor is relative to said inboard electromagnetic coil driver to a first rotor held balancing position;
said second inboard electromagnetic coil proximate said second counterweight balancing rotor;
said second inboard electromagnetic coil proximate said second inboard magnets of said second counterweight balancing rotor, wherein said second inboard electromagnetic coil is configured to generate an electromagnetic field capable of electromagnetically stepping said second inboard magnets of said second counterweight balancing rotor to electromagnetically actuate rotational movement of said second counterweight balancing rotor around said rotation axis, wherein the rotational movement of said second counterweight balancing rotor is relative to said inboard electromagnetic coil driver to a second rotor held position.

13. The aircraft system as claimed in claim 12, including a rotation restraint, said rotation restraint disposed proximate said inboard electromagnetic coil driver wherein said rotation restraint is configured to physically ground said inboard electromagnetic coil driver to a nonrotating machine member.

14. The aircraft system as claimed in claim 13, wherein said rotation restraint includes an electrical circuit, said electrical circuit capable of transmitting electricity through said rotation restraint.

15. The aircraft system as claimed in claim 12, wherein said first counterweight balancing rotor is rotationally supported by a first rotor bearing support assembly, and said second counterweight balancing rotor is rotationally supported by a second rotor bearing support assembly, wherein said first and second counterweight balancing rotors are contained in a rotating outer casing, said rotating outer casing housing said first and second counterweight balancing rotors, wherein said rotating outer casing being mechanically grounded to said rotating machine member with said first rotor bearing support assembly positioned between said first counterweight balancing rotor and an outboard circumference of said rotating outer casing, and with said second rotor bearing support assembly positioned between said second counterweight balancing rotor and said outboard circumference of said rotating outer casing.

16. The aircraft system as claimed in claim 15, including a liquid lubricant sealed inside said rotating outer casing.

17. The aircraft system as claimed in claim 16, wherein said rotating outer casing is comprised of a plurality of sealed welded casing members.

18. A method of electromagnetically balancing a rotating machine member which rotates about a rotation axis, said method including:
providing a first balancing rotor, said first balancing rotor including a plurality of first inboard magnets and a first outboard mass concentration;
providing an inboard electromagnetic coil driver, said inboard electromagnetic coil driver being nonrotating and including at least a first inboard electromagnetic coil;
disposing said inboard electromagnetic coil driver and said first balancing rotor around said rotating machine member with said first inboard electromagnetic coil proximate said first inboard magnets of said first balancing rotor, said inboard electromagnetic coil driver proximate said rotation axis and said first balancing rotor outboard of said inboard electromagnetic coil driver;
generating an electromagnetic field with said first inboard electromagnetic coil; and
electromagnetically stepping said first inboard magnets of said first balancing rotor to electromagnetically actuate rotational movement of said first balancing rotor around said rotating machine member, wherein the rotation of said first balancing rotor is relative to said inboard electromagnetic coil driver.

19. The method as claimed in claim 18, further comprising a plurality of inboard bearing members, said plurality of inboard bearing members being included with said inboard electromagnetic coil driver, and rotationally supporting said inboard electromagnetic coil driver upon said rotating machine member with said inboard bearing members.

20. The method as claimed in claim 19, further comprising positioning a plurality of inboard roller bearings between said first inboard electromagnetic coil and said rotation axis in said inboard bearing members, said inboard bearing members including said plurality of inboard roller bearings between said first inboard electromagnetic coil and said rotation axis.

21. The method as claimed in claim 18, further comprising:
providing a rotation restraint; and
disposing said rotation restraint proximate said inboard electromagnetic coil driver, wherein said rotation restraint physically grounds said inboard electromagnetic coil driver to a nonrotating machine member.

22. The method as claimed in claim 21, further comprising mechanically restraining said inboard electromagnetic coil driver with a circuit board within said rotation restraint and conducting electricity therewith.

23. The method as claimed in claim 22, further comprising coupling and decoupling a mating electrical connector on said nonrotating machine member with a rotation restraint electrical connector included with said rotation restraint.

24. The method as claimed in claim 18, further comprising:
providing a second balancing rotor, said second balancing rotor including a plurality of second inboard magnets and a second outboard mass concentration;
providing a second inboard electromagnetic coil, disposing said second inboard electromagnetic coil and second balancing rotor proximate said first inboard electromagnetic coil and said first balancing rotor, with said second inboard electromagnetic coil proximate said second inboard magnets of said second balancing rotor;
generating an electromagnetic field with said second inboard electromagnetic coil; and
electromagnetically stepping said second inboard magnets of said second balancing rotor to electromagnetically actuate rotational movement of said second balancing rotor around said rotation axis, wherein the rotation of said second balancing rotor is relative to said inboard electromagnetic coil driver.

25. The method as claimed in claim 24, further comprising:
providing a rotating center pole plate;
disposing said rotating center pole plate between said first balancing rotor and said second balancing rotor, said rotating center pole plate physically grounded to said rotating machine member;
rotating said rotating center pole plate along with said rotating machine member around said rotation axis, said rotating center pole plate providing a grounded rotating reference point for said first balancing rotor and said second balancing rotor to rotate, said first and second balancing rotors rotating relative to said rotation axis.

26. The method as claimed in claim 24, further comprising:
providing a first rotor bearing support assembly and rotationally supporting said first balancing rotor with said first rotor bearing support assembly; and providing a second rotor bearing support assembly and rotationally supporting said second balancing rotor with said second rotor bearing support assembly.

27. The method as claimed in claim 24, wherein said first balancing rotor has an outside diameter FCWROD and said first inboard electromagnetic coil has an outside diameter FEMCOD with FEMCOD<FCWROD.

28. The method as claimed in claim 27, wherein said first balancing rotor has an inside diameter FCWRID with FCWRID>FEMCOD.

29. The method as claimed in claim 24, wherein said second balancing rotor has an outside diameter SCWROD and an inside diameter SCWRID and said second inboard electromagnetic coil has an outside diameter SEMCOD with SEMCOD<SCWROD, and SEMCOD<SCWRID.

30. The method as claimed in claim 24, further comprising:
rotationally supporting said first balancing rotor with a first rotor bearing support assembly;
rotationally supporting said second balancing rotor with a second rotor bearing support assembly;
containing said first and second balancing rotors in a rotating outer casing;
housing said first and second balancing rotors in said rotating outer casing and mechanically grounding said rotating outer casing to said rotating machine member with said first rotor bearing support assembly positioned between said first balancing rotor and an outboard circumference of said rotating outer casing, and with said second rotor bearing support assembly positioned between said second balancing rotor and said outboard circumference of said rotating outer casing.

31. The method as claimed in claim 30, further comprising sealing a liquid lubricant inside said rotating outer casing.

32. The method as claimed in claim 30, wherein said rotating outer casing comprises a plurality of sealed welded casing members.

33. The method as claimed in claim 32, wherein said rotating outer casing includes a decoupling void.

34. The method as claimed in claim 24, further comprising monitoring a plurality of first balancing rotor positions and second balancing rotor positions relative to said inboard electromagnetic coil driver to provide a monitored performance health characteristic of said rotating machine member.

35. The method as claimed in claim 24, further comprising monitoring a plurality of balancer sensor outputs to provide a monitored performance health characteristic of said rotating machine member.

36. The method as claimed in claim 24, further comprising:
providing a plurality of pole plates;
disposing said pole plates proximate said first balancing rotor and said second balancing rotor, said pole plates physically grounded to said rotating machine member; and
rotating said pole plates along with said rotating machine member around said rotation axis and providing grounded rotating reference points for said first balancing rotor and said second balancing rotor to rotate relative to said rotation axis.

37. The method as claimed in claim 24, further comprising:
providing a center pole plate with a first side pole pattern and a second side staggered pole pattern, said center pole plate being staggered and rotating;
disposing said center pole plate between said first balancing rotor and said second balancing rotor, said center pole plate being physically grounded to said rotating machine member;
rotating said center pole plate along with said rotating machine member around said rotation axis and providing a grounded rotating reference point for said first balancing rotor and said second balancing rotor to rotate relative to said rotation axis.

38. The method as claimed in claim 24, further comprising:
orienting a first rotor bearing support flange arc with said first outboard mass concentration, wherein said first balancing rotor includes said first rotor bearing support flange arc;
orienting a second rotor bearing support flange arc with said second outboard mass concentration, wherein said second balancing rotor includes said second rotor bearing support flange arc;
retaining a first rotor bearing support assembly with said first rotor bearing support flange arc;
rotationally supporting said first balancing rotor with said first rotor bearing support assembly;
retaining a second rotor bearing support assembly with said second rotor bearing support flange arc; and
rotationally supporting said second balancing rotor with said second rotor bearing support assembly.

39. The method as claimed in claim 18, further comprising providing a first rotor bearing support assembly and rotationally supporting said first balancing rotor with said first rotor bearing support assembly.

40. The method as claimed in claim 18, further comprising monitoring a plurality of first balancing rotor positions relative to said inboard electromagnetic coil driver to provide a health characteristic of said rotating machine member over time.

41. A method of making an electromagnetically actuated balancer, said method including:
providing a first balancing rotor, said first balancing rotor including a plurality of first inboard magnets and a first outboard mass concentration;
providing an inboard electromagnetic coil driver, said inboard electromagnetic coil driver being nonrotating and including at least a first inboard electromagnetic coil,
disposing said first inboard electromagnetic coil proximate said first inboard magnets of said first balancing rotor, wherein said first inboard electromagnetic coil is configured to generate a magnetic field, said magnetic field capable of electromagnetically stepping said first inboard magnets of said first balancing rotor to electromagnetically actuate rotational movement of said first balancing rotor, wherein said rotational movement is relative to said inboard electromagnetic coil driver.

42. The method as claimed in claim 41, wherein providing said inboard electromagnetic coil driver includes providing a plurality of inboard bearing members, said bearing members for rotationally supporting said inboard electromagnetic coil driver around a rotating machine member.

43. The method as claimed in claim 42, wherein said inboard bearing members include a plurality of inboard roller bearings positioned between said first inboard electromagnetic coil and a rotation axis of said balancer.

44. The method as claimed in claim 41, including providing a rotation restraint, and disposing said rotation restraint proximate said inboard electromagnetic coil driver, wherein said rotation restraint provides for physically grounding said inboard electromagnetic coil driver to a nonrotating machine member.

45. The method as claimed in claim 41, further comprising:
providing a second balancing rotor, said second balancing rotor including a plurality of second inboard magnets and a second outboard mass concentration;
providing a second inboard electromagnetic coil; and
disposing said second inboard electromagnetic coil proximate said second inboard magnets of said second balancing rotor, wherein said second inboard electromagnetic coil is capable of generating a magnetic field, said magnetic field providing for electromagnetically stepping said second inboard magnets of said second balancing rotor to electromagnetically actuate rotational movement of said second balancing rotor around said rotation axis, wherein the rotational movement of said second balancing rotor is relative to said inboard electromagnetic coil driver.

46. The method as claimed in claim 45, further comprising:
providing a rotating center pole plate;
disposing said rotating center pole plate between said first balancing rotor and said second balancing rotor, said rotating center pole plate physically groundable to a rotating machine member, wherein said rotating center pole plate rotates along with said rotating machine member around a rotation axis thereby providing a grounded rotating holding stepping reference point for said first balancing rotor and said second balancing rotor to rotate, wherein the rotation of said first and second balancing rotors is relative to said rotation axis.

47. The method as claimed in claim 45, further comprising:
providing a first rotor bearing support assembly, said first rotor bearing support assembly rotationally supporting said first balancing rotor; and
providing a second rotor bearing support assembly, said second rotor bearing support assembly rotationally supporting said second balancing rotor.

48. The method as claimed in claim 45, wherein said first balancing rotor has an outside diameter FCWROD and said first inboard electromagnetic coil has an outside diameter FEMCOD with FEMCOD<FCWROD.

49. The method as claimed in claim 48, wherein said first balancing rotor has an inside diameter FCWRID with FCWRID>FEMCOD.

50. The method as claimed in claim 45, wherein said second balancing rotor has an outside diameter SCWROD and an inside diameter SCWRID and said second inboard electromagnetic coil has an outside diameter SEMCOD with SEMCOD<SCWROD, and SEMCOD<SCWRID.

51. The method as claimed in claim 45, further comprising:
rotationally supporting said first balancing rotor with a first rotor bearing support assembly;
rotationally supporting said second balancing rotor with a second rotor bearing support assembly;
containing and housing said first and second balancing rotors in a rotating outer casing; and
grounding said rotating outer casing mechanically to said rotating machine member with said first rotor bearing support assembly positioned between said first balancing rotor and an outboard circumference of said rotating outer casing, and with said second rotor bearing support assembly positioned between said second balancing rotor and said outboard circumference of said rotating outer casing.

52. The method as claimed in claim 51, further comprising sealing a liquid lubricant inside said rotating outer casing.

53. The method as claimed in claim 51, further comprising uniting a plurality of outer casing members, wherein said rotating outer casing comprises the plurality of outer casing members.

54. The method as claimed in claim 41, further comprising providing a first rotor bearing support assembly, said first rotor bearing support assembly rotationally supporting said first balancing rotor.

55. An electromagnetically actuated balancer for mounting on a rotating machine member and balancing said rotating machine member, said electromagnetically actuated balancer comprising:
at least a first balancing rotor, said first balancing rotor including a plurality of first inboard magnets and a first outboard mass concentration;
an inboard electromagnetic coil driver, said inboard electromagnetic coil driver being nonrotating and including at least a first inboard electromagnetic coil, said first inboard electromagnetic coil proximate said first inboard magnets of said first balancing rotor, wherein said first inboard electromagnetic coil is configured to generate an electromagnetic field capable of electromagnetically stepping said first inboard magnets of said at least first balancing rotor to electromagnetically actuate rotational movement of said first balancing rotor around said rotation axis, wherein the rotational movement of said first balancing rotor is relative to said inboard electromagnetic coil driver.

56. The electromagnetically actuated balancer as claimed in claim 55, wherein said inboard electromagnetic coil driver includes a plurality of bearing members, said bearing members positioned between said inboard electromagnetic coil driver and said rotating machine member.

57. The electromagnetically actuated balancer as claimed in claim 56, wherein said bearing members include a plurality of inboard roller bearings positioned between said first inboard electromagnetic coil and said rotation axis.

58. The electromagnetically actuated balancer as claimed in claim 55, wherein said electromagnetically actuated balancer includes a rotation restraint, said rotation restraint grounding said inboard electromagnetic coil driver to a nonrotating machine member.

59. The electromagnetically actuated balancer as claimed in claim 55, wherein said electromagnetically actuated balancer includes a second balancing rotor, said second balancing rotor having a plurality of second inboard magnets and a second outboard mass concentration, and said inboard electromagnetic coil driver including a second inboard electromagnetic coil, said second inboard electromagnetic coil proximate said second inboard magnets of said second balancing rotor, wherein said second inboard electromagnetic coil is configured to generate an electromagnetic field capable of electromagnetically stepping said second inboard magnets of said second balancing rotor to electromagnetically actuate rotational movement of said second balancing rotor around said rotation axis, wherein the rotational movement of said second balancing rotor is relative to said inboard electromagnetic coil driver.

60. The electromagnetically actuated balancer as claimed in claim 59, further comprising a rotating center pole plate, said rotating center pole plate disposed between said first balancing rotor and said second balancing rotor, said rotating center pole plate grounded to said rotating machine member wherein said rotating center pole plate is configured to rotate along with said rotating machine member around said rotation axis and provide a grounded rotating reference point for said first balancing rotor and said second balancing rotor to rotate, wherein said rotation is relative to said rotation axis.

61. The electromagnetically actuated balancer as claimed in claim 59, wherein said first balancing rotor is rotationally supported by a first rotor bearing support assembly, and said second balancing rotor is rotationally supported by a second rotor bearing support assembly.

62. The electromagnetically actuated balancer as claimed in claim 59, wherein said first balancing rotor has an outside diameter FCWROD and said first inboard electromagnetic coil has an outside diameter FEMCOD with FEMCOD<FCWROD.

63. The electromagnetically actuated balancer as claimed in claim 62, wherein said first balancing rotor has an inside diameter FCWRID with FCWRID>FEMCOD.

64. The electromagnetically actuated balancer as claimed in claim 59, wherein said second balancing rotor has an outside diameter SCWROD and an inside diameter SCWRID and said second inboard electromagnetic coil has an outside diameter SEMCOD with SEMCOD<SCWROD, and SEMCOD<SCWRID.

65. The electromagnetically actuated balancer as claimed in claim 59, wherein said first balancing rotor is rotationally supported by a first rotor bearing support assembly, and said second balancing rotor is rotationally supported by a second rotor bearing support assembly with said first and second balancing rotors contained in a rotating outer casing, said rotating outer casing housing said first and second counterweight balancing rotors, with said rotating outer casing mechanically grounded to said rotating machine member with said first rotor bearing support assembly positioned between said first balancing rotor and an outboard circumference of said rotating outer casing, and with said second rotor bearing support assembly positioned between said second balancing rotor and said outboard circumference of said rotating outer casing.

66. The electromagnetically actuated balancer as claimed in claim 65, further including a liquid lubricant, wherein said liquid lubricant is sealed inside said rotating outer casing.

67. The electromagnetically actuated balancer as claimed in claim 55, wherein said first balancing rotor is rotationally supported by a first rotor bearing support assembly.

* * * * *